United States Patent
Chu et al.

(10) Patent No.: US 11,751,191 B2
(45) Date of Patent: Sep. 5, 2023

(54) APPARATUS AND METHODS OF TRANSMIT POWER ALLOCATION IN WIRELESS COMMUNICATION SYSTEMS

(71) Applicant: NXP USA, Inc., Austin, TX (US)

(72) Inventors: Liwen Chu, San Ramon, CA (US); Yi-Ling Chao, Sunnyvale, CA (US); Hongyuan Zhang, Fremont, CA (US); Huiling Lou, Sunnyvale, CA (US); Young Hoon Kwon, Laguna Niguel, CA (US); Rui Cao, Sunnyvale, CA (US)

(73) Assignee: NXP USA, Inc., Austin, TX (US)

( * ) Notice: Subject to any disclaimer, the term of this patent is extended or adjusted under 35 U.S.C. 154(b) by 169 days.

(21) Appl. No.: 17/323,811

(22) Filed: May 18, 2021

(65) Prior Publication Data

US 2021/0360633 A1    Nov. 18, 2021

Related U.S. Application Data

(60) Provisional application No. 63/114,972, filed on Nov. 17, 2020, provisional application No. 63/078,468, (Continued)

(51) Int. Cl.
| | |
|---|---|
| *H04W 72/044* | (2023.01) |
| *H04W 72/0453* | (2023.01) |
| *H04W 52/36* | (2009.01) |
| *H04W 52/54* | (2009.01) |
| *H04B 7/0426* | (2017.01) |
| *H04B 7/0452* | (2017.01) |

(52) U.S. Cl.
CPC ..... *H04W 72/0473* (2013.01); *H04W 52/365* (2013.01); *H04W 52/367* (2013.01); *H04W 52/54* (2013.01); *H04W 72/0453* (2013.01); *H04B 7/0426* (2013.01); *H04B 7/0452* (2013.01)

(58) Field of Classification Search
None
See application file for complete search history.

(56) References Cited

U.S. PATENT DOCUMENTS

2016/0050634 A1 * 2/2016 Seok ............... H04W 52/146 370/338
2019/0253984 A1 * 8/2019 Cariou ............. H04W 52/36
(Continued)

OTHER PUBLICATIONS

Thomas Derham et al., "Miscellaneous 6 GHz channelization CIDs," IEEE P802.11—Wireless LANs; May 25, 2020; 31 pgs.

*Primary Examiner* — Jay L Vogel

(57) ABSTRACT

Various embodiments relate to a method performed by a station to identify the maximum allowed transmit power spectral density (PSD) of a basic service set (BSS), including: receiving, by the station, a first field from an access point (AP) of the BSS, wherein the first field indicates that the BSS bandwidth is set to M times a unit channel bandwidth; receiving, by the station, a set of second fields from the AP, wherein the set of second fields includes K fields corresponding to K channels and wherein each of the K second fields indicates the maximum allowed transmit PSD for the K channels and the bandwidth of the channel is the unit channel bandwidth; and identifying, by the station, the maximum allowed transmit PSD of the M channels of the BSS bandwidth from the first M consecutive second fields.

30 Claims, 7 Drawing Sheets

Related U.S. Application Data filed on Sep. 15, 2020, provisional application No. 63/066,869, filed on Aug. 18, 2020, provisional application No. 63/065,595, filed on Aug. 14, 2020, provisional application No. 63/051,415, filed on Jul. 14, 2020, provisional application No. 63/044,477, filed on Jun. 26, 2020, provisional application No. 63/026,331, filed on May 18, 2020.

(56) References Cited

U.S. PATENT DOCUMENTS

| | | | |
|---|---|---|---|
| 2019/0335454 A1* | 10/2019 | Huang | H04W 48/08 |
| 2019/0349067 A1* | 11/2019 | Huang | H04W 72/046 |
| 2020/0404549 A1* | 12/2020 | Verma | H04W 24/10 |
| 2021/0266847 A1* | 8/2021 | Cariou | H04W 52/52 |

* cited by examiner

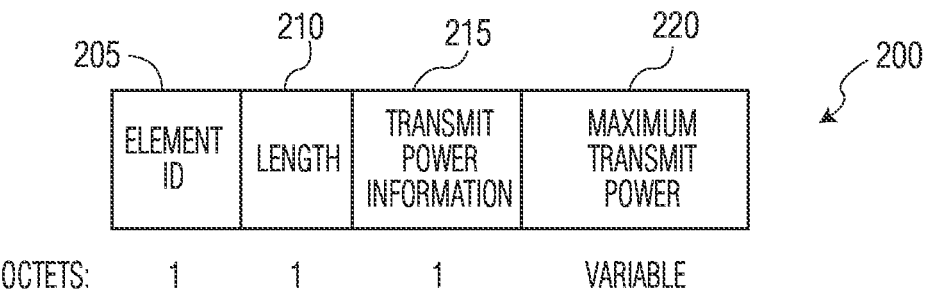
FIG. 2
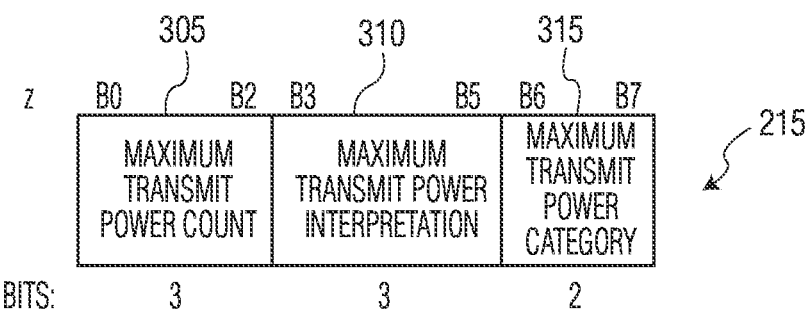
FIG. 3
| VALUE | INTERPRETATION OF THE MAXIMUM TRANSMIT POWER FIELD |
|---|---|
| 0 | LOCAL EIRP |
| 1 | LOCAL EIRP PSD (POWER SPECTRAL DENSITY) |
| 2 | REGULATORY CLIENT EIRP |
| 3 | REGULATORY CLIENT EIRP PSD |
| 4-7 | RESERVED |
DEFINITION OF MAXIMUM TRANSMIT POWER INTERPRETATION SUBFIELD
FIG. 4

MEANING OF MAXIMUM TRANSMIT POWER COUNT SUBFIELD
WHEN MAXIMUM TRANSMIT POWER INTERPRETATION SUBFIELD IS 0 OR 2

| VALUE | FIELD(S) PRESENT |
|---|---|
| 0 | MAXIMUM TRANSMIT POWER FOR 20 MHz. |
| 1 | MAXIMUM TRANSMIT POWER FOR 20 MHz AND MAXIMUM TRANSMIT POWER FOR 40 MHz. |
| 2 | MAXIMUM TRANSMIT POWER FOR 20 MHz, MAXIMUM TRANSMIT POWER FOR 40 MHz, AND MAXIMUM TRANSMIT POWER FOR 80 MHz. |
| 3 | MAXIMUM TRANSMIT POWER FOR 20 MHz, MAXIMUM TRANSMIT POWER FOR 40 MHz, MAXIMUM TRANSMIT POWER FOR 80 MHz, AND MAXIMUM TRANSMIT POWER FOR 160/80+80 MHz. FOR TVHT STAs, RESERVED. |
| 4-7 | RESERVED |

FIG. 5

MEANING OF MAXIMUM TRANSMIT POWER COUNT SUBFIELD
WHEN MAXIMUM TRANSMIT POWER INTERPRETATION SUBFIELD IS 1 OR 3

| VALUE | N |
|---|---|
| 0 | 0 |
| 1 | 1 |
| 2 | 2 |
| 3 | 4 |
| 4 | 8 |
| 5-7 | RESERVED FOR FUTURE USE TO INDICATE VALUES OF N GREATER THAN 8 |

FIG. 6

APPARATUS AND METHODS OF TRANSMIT POWER ALLOCATION IN WIRELESS COMMUNICATION SYSTEMS

CROSS-REFERENCE TO RELATED APPLICATIONS

This application claims benefit to U.S. Provisional Patent Application Nos. 63/026,331 filed on May 18, 2020, 63/044,477 filed on Jun. 26, 2020, 63/051,415 filed on Jul. 14, 2020, 63/065,595 filed Aug. 14, 2020, 63/066,869 filed Aug. 18, 2020, 63/078,468 filed Sep. 15, 2020, and 63/114,972 filed on Nov. 17, 2020, the contents of each which are hereby incorporated by reference for all purposes as if fully set forth herein.

TECHNICAL FIELD

Various exemplary embodiments disclosed herein relate generally to apparatus and methods of transmit power allocation in wireless communication systems.

SUMMARY

A summary of various exemplary embodiments is presented below. Some simplifications and omissions may be made in the following summary, which is intended to highlight and introduce some aspects of the various exemplary embodiments, but not to limit the scope of the invention. Detailed descriptions of an exemplary embodiment adequate to allow those of ordinary skill in the art to make and use the inventive concepts will follow in later sections.

Various embodiments relate to a method performed by a station to identify the maximum allowed transmit power spectral density (PSD) of a basic service set (BSS), including: receiving, by the station, a first field from an access point (AP) of the BSS, wherein the first field indicates that the BSS bandwidth is set to M times a unit channel bandwidth; receiving, by the station, a set of second fields from the AP, wherein the set of second fields includes K fields corresponding to K channels and wherein each of the K second fields indicates the maximum allowed transmit PSD for the K channels and the bandwidth of the channel is the unit channel bandwidth; and identifying, by the station, the maximum allowed transmit PSD of the M channels of the BSS bandwidth from the first M consecutive second fields.

Various embodiments are described, wherein the first M consecutive second fields indicates the maximum allowed transmit PSD for unit channels from the lowest to the highest frequency, respectively, within the BSS bandwidth for non-EHT STAs.

Various embodiments are described, wherein the unit channel bandwidth is 20 MHz.

Various embodiments are described, wherein the set of second fields are included in a transmit power envelope (TPE) element.

Various embodiments are described, wherein the set of second fields are included in a transmit power envelope (TPE) element, and wherein the first M consecutive second fields are maximum allowed transmit PSD X subfields in the TPE, where X is a positive integer where $1 \leq X \leq M$.

Various embodiments are described, wherein the station ignores the M+1 to K second subfields when the station is a non-EHT station.

Various embodiments are described, wherein the BSS bandwidth is a BSS bandwidth for non-EHT stations, an EHT BSS bandwidth is K times the unit channel bandwidth, and the station uses M+1 to K second subfields to identify the maximum allowed transmit PSD of the EHT BSS bandwidth outside of the BSS bandwidth, when the station is an EHT station.

Various embodiments are described, wherein M+1 to K second subfields to identify the maximum allowed transmit PSD of the EHT BSS bandwidth outside of the BSS bandwidth are ordered from the lowest to the highest frequency, within the EHT BSS bandwidth.

Various embodiments are described, wherein the TPE element includes a maximum allowed transmit power interpretation subfield that is set to a value indicating a local effective isotropically radiated power (EIRP) PSD or a regulatory client EIRP PSD.

Further various embodiments relate to a station configured to identify the maximum allowed transmit power spectral density (PSD) of a basic service set (BSS), including: a receiver configured to receive a first field from an access point (AP) of the BSS, wherein the first field indicates that the BSS bandwidth is set to M times a unit channel bandwidth, and receive a set of second fields from the AP, wherein the set of second fields includes K fields corresponding to K channels and wherein each of the K second fields indicates the maximum allowed transmit PSD for the K channels and the bandwidth of the channel is the unit channel bandwidth; and a processor configured to identify the maximum allowed transmit PSD of the M channels of the BSS bandwidth from the received first M consecutive second fields.

Various embodiments are described, wherein the first M consecutive second fields indicates the maximum allowed transmit PSD for unit channels from the lowest to the highest frequency, respectively, within the BSS bandwidth for non-EHT STAs.

Various embodiments are described, wherein the channel bandwidth is 20 MHz.

Various embodiments are described, wherein the set of second fields are included in a transmit power envelope (TPE) element.

Various embodiments are described, wherein the set of second fields are included in a transmit power envelope (TPE) element, and wherein the first M consecutive second fields are maximum allowed transmit PSD X subfields in the TPE, where X is a positive integer where $1 \leq X \leq M$.

Various embodiments are described, wherein the station ignores the M+1 to K second subfields when the station is a non-EHT station.

Various embodiments are described, wherein the BSS bandwidth is a BSS bandwidth for non-EHT stations, an EHT BSS bandwidth is K times the unit channel bandwidth, and the station uses M+1 to K second subfields to identify the maximum allowed transmit PSD of the EHT BSS bandwidth outside of the BSS bandwidth, when the station is an EHT station.

Various embodiments are described, wherein M+1 to K second subfields to identify the maximum allowed transmit PSD of the EHT BSS bandwidth outside of the BSS bandwidth are ordered from the lowest to the highest frequency, within the EHT BSS bandwidth.

Various embodiments are described, wherein the TPE element includes a maximum allowed transmit power interpretation subfield that is set to a value indicating a local effective isotropically radiated power (EIRP) PSD or a regulatory client EIRP PSD.

Further various embodiments relate to a method performed by an access point to advertise the maximum allowed transmit power spectral density (PSD) of a basic service set (BSS) to a station, including: transmitting, by the AP, a first field from to a station of the BSS, wherein the first field indicates that the BSS bandwidth is set to M times a unit channel bandwidth; transmitting, by the AP, a set of second fields from to the station, wherein the set of second fields includes K fields corresponding to K channels and wherein each of the K second fields indicates the maximum allowed transmit PSD for the K channels and the bandwidth of the channel is the unit channel bandwidth; and receiving from the station a frame wherein the maximum allowed transmit PSD of the M channels of the BSS bandwidth is based upon first M consecutive second fields.

Various embodiments are described, wherein the first M consecutive second fields indicates the maximum allowed transmit PSD for unit channels from the lowest to the highest frequency, respectively, within the BSS bandwidth for non-EHT STAs.

Various embodiments are described, wherein the channel bandwidth is 20 MHz.

Various embodiments are described, wherein the set of second fields are included in a transmit power envelope (TPE) element.

Various embodiments are described, wherein the set of second fields are included in a transmit power envelope (TPE) element, and wherein the first M consecutive second fields are maximum allowed transmit PSD X subfields in the TPE, where X is a positive integer where $1 \leq X \leq M$.

Various embodiments are described, wherein the BSS bandwidth is a BSS bandwidth for non-EHT stations, an EHT BSS bandwidth is K times the unit channel bandwidth, and the M+1 to K second subfields indicate the maximum allowed transmit PSD of the EHT BSS bandwidth outside of the BSS bandwidth, when the station is an EHT station.

Various embodiments are described, wherein M+1 to K second subfields to identify the maximum allowed transmit PSD of the EHT BSS bandwidth outside of the BSS bandwidth are ordered from the lowest to the highest frequency, within the EHT BSS bandwidth.

Various embodiments are described, wherein the TPE element includes a maximum allowed transmit power interpretation subfield that is set to a value indicating a local effective isotropically radiated power (EIRP) PSD or a regulatory client EIRP PSD.

Further various embodiments relate to an access point configured to advertise the maximum allowed transmit power spectral density (PSD) of a basic service set (BSS) to a station, including: a transmitter configured to transmit a first field to the station, wherein the first field indicates that the BSS bandwidth is set to M times a unit channel bandwidth, and transmit a set of second fields to the station, wherein the set of second fields includes K fields corresponding to K channels and wherein each of the K second fields indicates the maximum allowed transmit PSD for the K channels and the bandwidth of the channel is the unit channel bandwidth; and a receiver configured to receive from the station a frame wherein the maximum allowed transmit PSD of the M channels of the BSS bandwidth is based upon first M consecutive second fields.

Various embodiments are described, wherein the first M consecutive second fields indicates the maximum allowed transmit PSD for unit channels from the lowest to the highest frequency, respectively, within the BSS bandwidth for non-EHT STAs.

Various embodiments are described, wherein the channel bandwidth is 20 MHz.

Various embodiments are described, wherein the set of second fields are included in a transmit power envelope (TPE) element.

Various embodiments are described, wherein the set of second fields are included in a transmit power envelope (TPE) element, and wherein the first M consecutive second fields are maximum allowed transmit PSD X subfields in the TPE, where X is a positive integer where $1 \leq X \leq M$.

Various embodiments are described, wherein the BSS bandwidth is a BSS bandwidth for non-EHT stations, an EHT BSS bandwidth is K times the unit channel bandwidth, and the station uses M+1 to K second subfields to identify the maximum allowed transmit PSD of the EHT BSS bandwidth outside of the BSS bandwidth, when the station is an EHT station.

Various embodiments are described, wherein M+1 to K second subfields to identify the maximum allowed transmit PSD of the EHT BSS bandwidth outside of the BSS bandwidth are ordered from the lowest to the highest frequency, within the EHT BSS bandwidth.

Various embodiments are described, wherein the TPE element includes a maximum allowed transmit power interpretation subfield that is set to a value indicating a local effective isotropically radiated power (EIRP) PSD or a regulatory client EIRP PSD.

BRIEF DESCRIPTION OF THE DRAWINGS

In order to better understand various exemplary embodiments, reference is made to the accompanying drawings, wherein:

FIG. 2. illustrates the TPI element format;

FIG. 3 illustrates the transmit power information field format;

FIG. 4 illustrates a table providing the definition of the maximum transmit power interpretation subfield;

FIG. 5 illustrates a table providing the meaning of the maximum transmit power count subfield when the maximum transmit power interpretation subfield is 0 or 2;

FIG. 6 illustrates a table providing the meaning of the maximum transmit power count subfield when the maximum transmit power interpretation subfield is 1 or 3;

To facilitate understanding, identical reference numerals have been used to designate elements having substantially the same or similar structure and/or substantially the same or similar function.

DETAILED DESCRIPTION

The description and drawings illustrate the principles of the invention. It will thus be appreciated that those skilled in the art will be able to devise various arrangements that, although not explicitly described or shown herein, embody the principles of the invention and are included within its scope. Furthermore, all examples recited herein are principally intended expressly to be for pedagogical purposes to aid the reader in understanding the principles of the invention and the concepts contributed by the inventor(s) to furthering the art and are to be construed as being without limitation to such specifically recited examples and conditions. Additionally, the term, "or," as used herein, refers to a non-exclusive or (i.e., and/or), unless otherwise indicated (e.g., "or else" or "or in the alternative"). Also, the various embodiments described herein are not necessarily mutually exclusive, as some embodiments can be combined with one or more other embodiments to form new embodiments.

Figure 1:
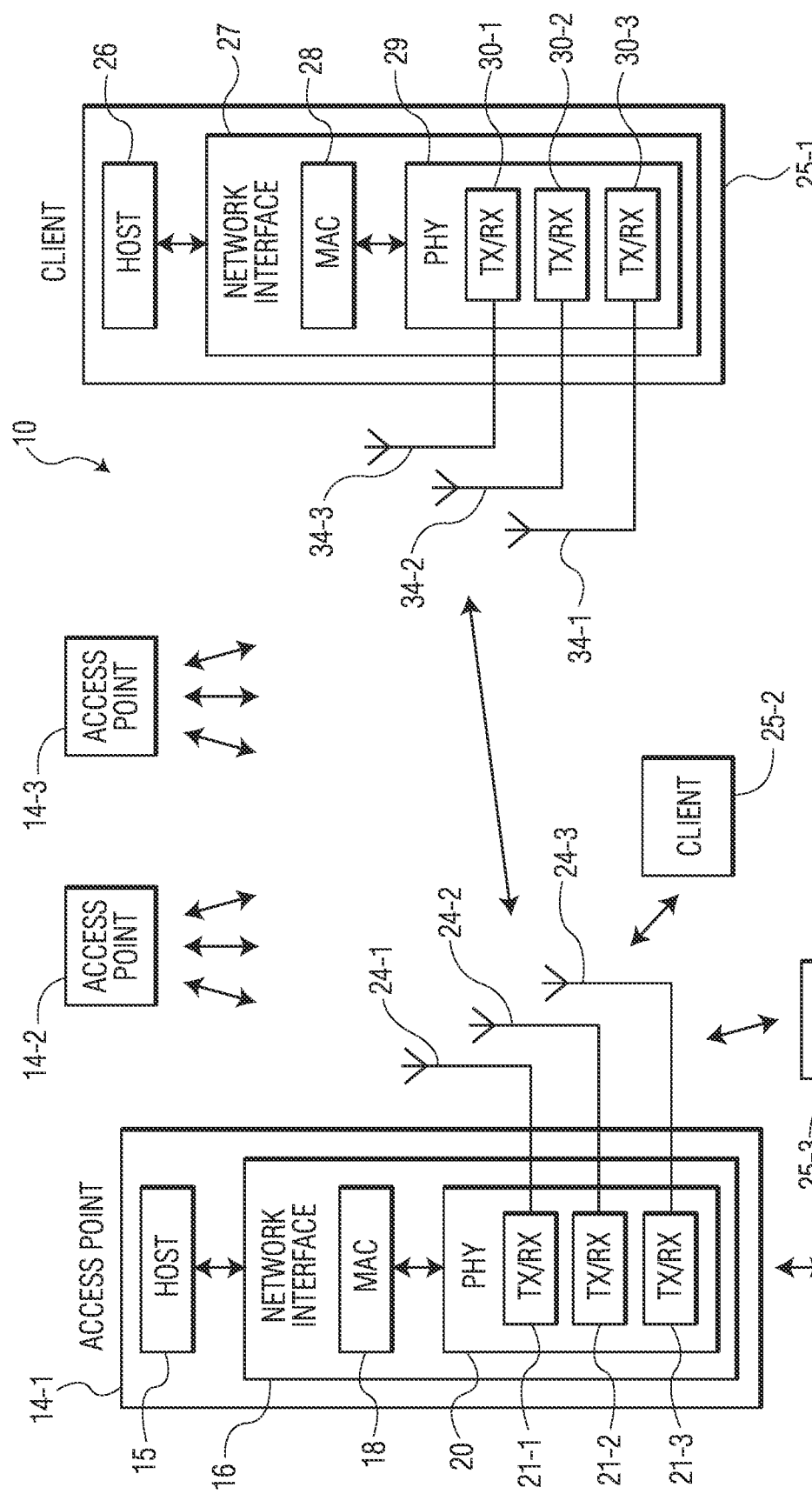
FIG. 1 is a block diagram of an example wireless local area network (WLAN), according to an embodiment.

FIG. 1 is a block diagram of an example wireless local area network (WLAN) 10, according to an embodiment. Such a WLAN 10 may need to be able to update operating parameters across a range of different versions of Wi-Fi or IEEE 802.11. An access point (AP) 14-1 includes a host processor 15 coupled to a network interface 16. The network interface 16 includes a medium access control (MAC) processing unit 18 and a physical layer (PHY) processing unit 20. The PHY processing unit 20 includes a plurality of transceivers 21, and the transceivers 21 are coupled to a plurality of antennas 24. Although three transceivers 21 and three antennas 24 are illustrated in FIG. 1, the AP 14 may include different numbers (e.g., 1, 2, 4, 5, etc.) of transceivers 21 and antennas 24 in other embodiments. The WLAN 10 may include multiple APs 14-1, 14-2, 14-3 as shown, but any number of APs 14 may be included in WLAN 10.

The WLAN 10 includes a plurality of client stations (STA) 25. Although four client stations 25 are illustrated in FIG. 1, the WLAN 10 may include different numbers (e.g., 1, 2, 3, 5, 6, etc.) of client stations 25 in various scenarios and embodiments. Two or more of the client stations 25 are configured to receive corresponding data streams that are transmitted simultaneously by the AP 14. Additionally, two or more of the client stations 25 are configured to transmit corresponding data streams to the AP 14 such that the AP 14 simultaneously receives the data streams. Also, the client stations 25 are configured to receive data streams that are transmitted simultaneously by multiple APs 14. Likewise, the client stations 25 may transmit data streams simultaneously to the multiple APs 14.

A client station 25-1 includes a host processor 26 coupled to a network interface 27. The network interface 27 includes a MAC processing unit 28 and a PHY processing unit 29. The PHY processing unit 29 includes a plurality of transceivers 30, and the transceivers 30 are coupled to a plurality of antennas 34. Although three transceivers 30 and three antennas 34 are illustrated in FIG. 1, the client station 25-1 may include different numbers (e.g., 1, 2, 4, 5, etc.) of transceivers 30 and antennas 34 in other embodiments.

In an embodiment, one or more of the client stations 25-2, 25-3, and 25-4 has a structure the same as or similar to the client station 25-1. In these embodiments, the client stations 25 structured like the client station 25-1 have the same or a different number of transceivers and antennas. For example, the client station 25-2 has only two transceivers and two antennas (not shown), according to an embodiment.

In an embodiment, the APs 14 and the client stations 25 contend for communication medium using carrier sense multiple access with collision avoidance (CSMA/CA) protocol or another suitable medium access protocol. Further, in an embodiment, the APs 14 or a client station 25 dynamically selects a bandwidth for a transmission based on unit channels available for the transmission.

In an embodiment, the APs 14 are configured to simultaneously transmit different orthogonal frequency division multiplexing (OFDM) units to different client stations 25 by forming an OFDM access (OFDMA) data unit that includes the different OFDM data units modulated in respective sub-channel blocks of the OFDMA data unit. In an embodiment, the AP 14 allocates different sub-channels to different client stations and forms the OFDMA data unit that includes OFDM data units directed to by modulating the different client stations in sub-channel blocks corresponding to the sub-channels assigned to the client stations.

In an embodiment, the APs 14 are configured to simultaneously transmit different OFDM units to different client stations 25 by transmitting the different OFDM data units via different space time streams of a MU-MIMO communication channel. In an embodiment, the APs 14 allocates different sub-channels (i.e., space time streams) to different client stations and forms the OFDM data units and modulates the different OFDM data units to the space time streams corresponding to the sub-channels assigned to the client stations.

Various iterations of the 802.11 specification are referred to herein. IEEE 802.11ac is referred to as very high throughput (VHT). IEEE 802.11ax is referred to as high efficiency (HE). IEEE 802.11be is referred to as extreme high throughput (EHT). The terms VHT, HE, and EHT will be used in the descriptions found herein.

During the standardization of IEEE 802.11ax, a Transmit Power Envelope (TPE) element has been modified such that power limits for client devices may be based on not only EIRP, but also on EIRP PSD (Power Spectral Density), and also power limits may depend on the client device category/type. FIG. 2. illustrates the TPI element format. The TPE element 200 includes an octet for each of an element ID 205, a length 210, and transmit power information 215. A last field is a maximum transmit power field 220 that is of a variable length. It is noted that the maximum transmit power field 220 specifies the maximum allowed power. FIG. 3 illustrates the transmit power information field format. The transmit power information field 215 includes a three bit maximum transmit power count 305, a three bit maximum transmit power interpretation 310, and two bit maximum transmit power category 315.

FIG. 4 illustrates a table providing the definition of the maximum transmit power interpretation subfield. The table 400 includes values of 0 to 3 and their associated interpretations with values 4 to 7 being reserved. FIG. 5 illustrates a table providing the meaning of the maximum transmit power count subfield when the maximum transmit power interpretation subfield is 0 or 2. The table 500 includes values 0 to 3 and their associated means that define the maximum transmit power for various bandwidths with values 4 to 7 being reserved. FIG. 6 illustrates a table providing the meaning of the maximum transmit power count subfield when the maximum transmit power interpretation subfield is 1 or 3. The table 600 includes values 0 to 4 and their associated values of N with values 5 to 7 being reserved for future used to indicate values of N greater than 8.

Figure 7:
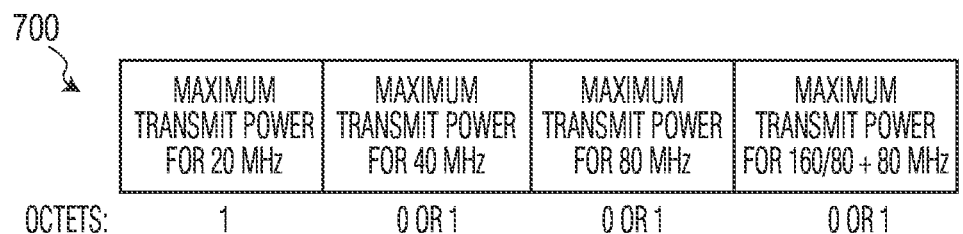
FIG. 7 illustrates the maximum transmit power field format when the maximum transmit power interpretations subfield is 0 or 2.
Figure 8:
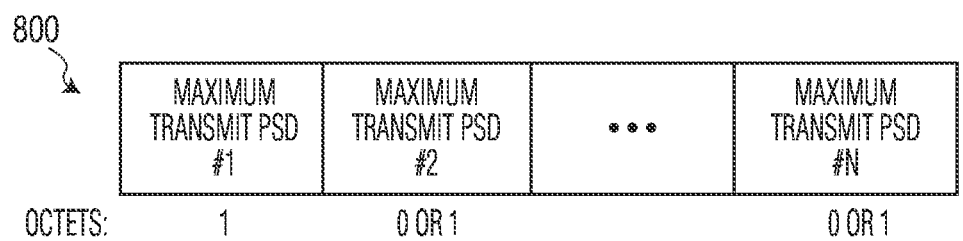
FIG. 8 illustrates the maximum transmit power field format when the maximum transmit power interpretations subfield is 1 or 3.

FIG. 7 illustrates the maximum transmit power field format when the maximum transmit power interpretations subfield is 0 or 2. This field 700 includes octets that include the maximum transmit power for various bandwidths as shown. Such a field 700 may be used with the various options described herein. FIG. 8 illustrates the maximum transmit power field format when the maximum transmit power interpretations subfield is 1 or 3. This field 800 includes the maximum transmit power spectral density (PSD) for each of the N different unit channels that will be used. Such a field 800 may be used with the various options described herein. It is noted that the maximum transmit PSD is the maximum allowed transmit PSD.

When the Maximum Transmit Power Interpretation subfield is 1 or 3 (EIRP PSD), the Maximum Transmit Power Count subfield determines the value of an integer N as follows. If N is 0, then the Maximum Transmit Power field has one octet (Maximum Transmit PSD #1), and this octet represents the maximum transmit PSD for a PHY Protocol Data Unit (PPDU) of any bandwidth within the BSS bandwidth. If N is greater than 0, then the Maximum Transmit Power field has N octets, with N representing the number of 20 MHz unit channels for which a maximum transmit PSD is indicated. The $X^{th}$ octet (X=an integer ranging from 1 to N) of the Maximum Transmit Power field is the Maximum Transmit PSD #X subfield, which indicates the maximum transmit PSD for the $X^{th}$ 20 MHz channel. While 20 MHz unit channels are described herein, the unit channels may be other bandwidths as well.

When the BSS bandwidth is 20, 40, 80, or 160 MHz, N is less than or equal to 1, 2, 4, or 8, respectively. The Maximum Transmit PSD #1 to N subfields correspond to 20 MHz channels from lowest to highest frequency, respectively, within the indicated bandwidth. If N is equal to 1, 2, 4, or 8 for 20, 40, 80, or 160 MHz BSS bandwidth, respectively, the indicated bandwidth is the BSS bandwidth. If N is greater than 0 and less than 2, 4, or 8 for 40, 80, or 160 MHz BSS bandwidth, respectively, then the indicated bandwidth is the primary 20 MHz, primary 40 MHz, or primary 80 MHz channel for N equal to 1, 2, or 4, respectively.

When the BSS bandwidth is 80+80 MHz, N is less than or equal to 8. If N is equal to 8 and the BSS bandwidth is 80+80 MHz: the Maximum Transmit PSD #1 to 4 subfields correspond to the 20 MHz channels from lowest to highest frequency, respectively, within the 80 MHz segment lower in frequency; and the Maximum Transmit PSD #5 to 8 subfields correspond to the 20 MHz channels from lowest to highest frequency, respectively, within the 80 MHz segment higher in frequency. If N is greater than 0 and less than 8 for 80+80 MHz BSS bandwidth, then the bandwidth indicated by the Maximum Transmit PSD #1 to N subfields is the primary 20 MHz, primary 40 MHz, or primary 80 MHz channel for N equal to 1, 2, or 4, respectively. In this case, the Maximum Transmit PSD #1 to N subfields correspond to 20 MHz channels from lowest to highest frequency, respectively, within the indicated bandwidth.

Values of the Maximum Transmit Power Count field between 5 and 7 are reserved for future use to indicate values of N greater than 8. If N is greater than 8, the Maximum Transmit PSD #1 to 8 subfields correspond to the 20 MHz channels from lowest to highest frequency, respectively, within the 160 MHz channel containing the primary 20 MHz channel.

The Maximum Transmit PSD #X subfield is encoded as an 8-bit 2s complement signed integer. The value −128 indicates that the corresponding 20 MHz channel cannot be used for transmission. The value of +127 indicates that no maximum PSD limit is specified for the corresponding 20 MHz channel. For all other values Y of the subfield (i.e., −127 to +126, inclusive), the maximum transmit PSD in the corresponding 20 MHz channel is Y/2 dBm/MHz (i.e., ranging from −63.5 to +63 dBm/MHz).

The 802.11ax (HE) TPE element has issues when a WiFi network implements 802.11be. In HE, encoding of the TPE element is based on an assumption that there is only one BSS bandwidth. However, during the standardization of IEEE 802.11be, different BSS bandwidth may be defined for EHT STAs and non-EHT (or legacy) STAs, especially in 6 GHz band. A legacy STA is any STA that implements a version of 802.11 prior to 802.11be or one that does not implement the features of 802.11be. It is agreed in 802.11be that in the 6 GHz band, an EHT AP may announce a different BSS operating bandwidth to non-EHT STAs than the BSS operating bandwidth it announces to EHT STAs when the EHT BW includes disallowed 20 MHz channels and/or when the announced EHT BW is not supported by non-EHT amendments. The advertised BSS operating bandwidth to EHT STA shall include the advertised BSS operating bandwidth to non-EHT STA.

In this case, the current encoding of the TPE element cannot indicate the transmit power constraints to EHT STAs and non-EHT STAs correctly.

An operation example will now be provided that illustrates this issue. Assume that the VHT BSS bandwidth is 80 MHz and the EHT BSS bandwidth is 160 MHz.

When the Maximum Transmit Power Interpretation subfield is set to 1 or 3: if the Maximum Transmit Power Count subfield is set to 4 (N=8) to satisfy the EHT STAs, the VHT STAs cannot identify the maximum transmit PSD of each 20 MHz correctly because the VHT STAs do not know which 20 MHz channel each $X^{th}$ octet of the Maximum Transmit Power field implies; and if the Maximum Transmit Power Count subfield is set to 3 (N=4) to satisfy the VHT STAs, the EHT STs cannot identify the maximum transmit PSD of the secondary 80 MHz channel because the Maximum Transmit PSD #X subfield can only indicate up to primary a 80 MHz channel.

A first solution for sharing the TPE element among EHT and non-EHT STAs will now be described. When a non-EHT STA receives a frame from its serving AP including a first field indicating that the BSS bandwidth for the non-EHT STAs is set to M*20 MHz and a set of second fields indicating the maximum transmit PSD for K*20 MHz channels, wherein the number of second fields in the set is K and each second field indicates the maximum transmit PSD for 20 MHz channels within the K*20 MHz channel, the non-EHT STA identifies the maximum transmit PSD of the M*20 MHz BSS bandwidth for non-EHT STAs from the first M consecutive second fields.

Further, when an EHT STA receives a frame from its serving AP including a first field indicating that the BSS bandwidth for the non-EHT STAs is set to M*20 MHz and a set of second fields indicating the maximum transmit PSD for K*20 MHz channels, wherein the number of second fields in the set are K and each second field indicates the maximum transmit PSD for 20 MHz channels within the K*20 MHz channel, the EHT STA identifies the maximum transmit PSD of the M*20 MHz BSS bandwidth for non-EHT STAs from the first M consecutive second fields. It is noted that throughout this description, that if M=8, the BSS bandwidth can be 160 MHz or 80+80 MHz, unless otherwise specifically mentioned.

An implementation of this first solution may include the following. Assume the following: the non-EHT STA is an HE STA; M is less than 8; and K is greater than M. In one embodiment, K is less than or equal to 8 (1<=M<K<=8).

The EHT STA further receives a third field from the serving AP indicating that the BSS bandwidth for EHT STAs is set to K*20 MHz.

The EHT STA further identifies the maximum transmit PSD of the BSS bandwidth for EHT STAs that is not covered by the BSS bandwidth for non-EHT STAs from $(M+1)^{th}$ second fields.

In one embodiment, the (M+1) to K second fields correspond to the 20 MHz channels from the lowest to the highest frequency, respectively, within the BSS bandwidth for the EHT STAs excluding the 20 MHz channels that have been indicated by the 1 to M second fields.

In one embodiment, if the highest 20 MHz channel of the BSS bandwidth for the EHT STAs is higher than the highest 20 MHz channel of the BSS bandwidth for the non-EHT STAs, the $(M+1)^{th}$ second field corresponds to the 20 MHz channel that is higher than any of 20 MHz channels that the first M second fields correspond to.

In one embodiment, if the lowest 20 MHz channel of the BSS bandwidth for EHT STAs is lower than the lowest 20 MHz channel of the BSS bandwidth for non-EHT STAs, the $(M+1)^{th}$ second field corresponds to the 20 MHz channel that is lower than any of 20 MHz channels that the first M second fields correspond to.

In one embodiment, (M+1) to 2*M second fields correspond to the 20 MHz channels from the lowest to the highest frequency, respectively, of the secondary M*20 MHz channels of the BSS bandwidth for the EHT STAs.

In one example, the first M consecutive second fields indicates the maximum transmit PSD for 20 MHz channels from the lowest to the highest frequency, respectively, within the M*20 MHz BSS bandwidth for non-EHT STAs. The set of second fields are included in a TPE element. This leads to the following different embodiments. In one embodiment, the Maximum Transmit Power Interpretation subfield of the TPE element is further set to a value that corresponds to Local EIRP PSD. In another embodiment, the Maximum Transmit Power Interpretation subfield of the TPE element is further set to a value that corresponds to Regulatory client EIRP PSD.

The first M consecutive second fields are Maximum Transmit PSD #1 to M subfields in a TPE element.

A first option for implementing the PSD indication for EHT STAs will now be described. When the BSS bandwidth for non-EHT STAs is set to M*20 MHz and if the Maximum Transmit Power Count subfield in a TPE element is set to a value indicating that N is greater than M, the Maximum Transmit PSD #1 to M subfields of the TPE element correspond to the 20 MHz channels from the lowest to the highest frequency, respectively, within the BSS bandwidth for non-EHT STAs (containing the primary 20 MHz channel). The non-EHT STAs are HE STAs. N is equal to K where K is as described above. The Maximum Transmit PSD #(M+1) to N subfields correspond to the 20 MHz channels from the lowest to the highest frequency, respectively, within the BSS bandwidth for EHT STAs excluding the 20 MHz channels that have been indicated by the Maximum Transmit PSD #1 to M. The non-EHT STAs shall ignore the Maximum Transmit PSD #X subfields with X>M. The TPE element further includes a Maximum Transmit Power Interpretation subfield that is set to a value indicating Local EIRP PSD or Regulatory client EIRP PSD.

A number of operating examples will be presented to further describe the first option for sharing the TPE element among EHT and non-EHT STAs. In a first example, the BSS bandwidth is 40 MHz for non-EHT STAs, and is 160 MHz for EHT STAs. For the entire 160 MHz bandwidth, the following maximum transmit PSD is defined: 40 MHz (channel #1, 5) within the secondary 40 MHz channel is punctured so that no transmit is allowed; Non-EHT STAs can only access the P20 and S20 channels (40 MHz) (where P(A) and S(B) means Primary (A) MHz channel and Secondary (B) MHz channel); and the maximum transmit PSD for all 20 MHz channels are defined as below:

| | S40 | | P20 | S20 | S80 | | | |
|---|---|---|---|---|---|---|---|---|
| Channel # | 1 | 5 | 9 | 13 | 17 | 21 | 25 | 29 |
| Max Xmit PSD [dBm/MHz] | N/A | N/A | 22 | 22.5 | 23 | 23 | 23 | 23 |

Then in a TPE element, N is set to 8 and the Maximum Transmit PSD #1 to 8 subfields are set as follows.
  Maximum Transmit PSD #1=44: the lowest frequency channel for non-EHT STA (Channel #=9);
  Maximum Transmit PSD #2=45: The next lowest freq. channel for non-EHT STAs (Channel #=13);
  Maximum Transmit PSD #3 and #4=−128: The 2 lowest freq. channels for EHT STAs except P20 and S20 (Channel #=1, 5) and indicates that channel is punctured; and
  Maximum Transmit PSD #5 to #8=46: The next 4 lowest freq. channels for EHT STAs except P20 and S20 (Channel #=17, 21, 25, 29)

In a second example, the BSS bandwidth is 40 MHz for non-EHT STAs and is 160 MHz for EHT STAs. For the entire 160 MHz bandwidth, the following maximum transmit PSD is defined: 40 MHz (channel #1, 5) within the secondary 40 MHz channel is punctured so that no transmit is allowed; Non-EHT STAs can only access the P20 and S20 channels (40 MHz) and the maximum transmit PSD for all 20 MHz channels are defined as below:

| | S40 | | P20 | S20 | S80 | | | |
|---|---|---|---|---|---|---|---|---|
| Channel # | 1 | 5 | 9 | 13 | 17 | 21 | 25 | 29 |
| Max Xmit PSD [dBm/MHz] | N/A | N/A | 22 | 22.5 | 23 | 23 | 23 | 23 |

Then, in a TPE element, N is set to 4 and the Maximum Transmit PSD #1 to 4 subfields are set as below:
  Maximum Transmit PSD #1=44: The lowest frequency channel for non-EHT STA (Channel #=9);
  Maximum Transmit PSD #2=45: The next lowest freq. channel for non-EHT STAs (Channel #=13); and
  Maximum Transmit PSD #3 and #4=−128: The 2 lowest freq. channels for EHT STAs except P20 and S20 (Channel #=1, 5) and indicates that channel is punctured.

In this example, N*20 MHz is greater than the BSS bandwidth for non-EHT STAs but is less than the BSS bandwidth for EHT STAs. As N is set to 4, the Maximum Transmit PSD #1 to 4 subfields indicate the maximum transmit PSD of primary 80 MHz of the BSS bandwidth for EHT STAs.

A second option for Sharing TPE element among EHT and non-EHT STAs using a PSD indication for EHT STAs will now be described. When the BSS bandwidth for non-EHT STAs is set to M*20 MHz and if the Maximum Transmit Power Count subfield in a TPE element is set to a value indicating that N is greater than M, the Maximum Transmit PSD #1 to M subfields of the TPE element correspond to the 20 MHz channels from the lowest to the highest frequency, respectively, within the BSS bandwidth for non-EHT STAs (containing the primary 20 MHz channel). In this example, the non-EHT STAs are HE STAs. The N is equal to K where K is as defined above. If the BSS bandwidth for EHT STAs is composed of one contiguous frequency segment then: the Maximum Transmit PSD #(M+1) to N subfields correspond to the 20 MHz channels from the lowest to the highest frequency, respectively, within the BSS bandwidth for EHT STAs excluding the 20 MHz channels that have been indicated by the Maximum Transmit PSD #1 to M.

If the BSS bandwidth for EHT STAs is composed of two non-contiguous frequency segments then: the Maximum Transmit PSD #(M+1) to (N/2) subfields correspond to the 20 MHz channels from the lowest to the highest frequency, respectively, within a frequency segment that includes the Primary 20 MHz channel excluding the 20 MHz channels that have been indicated by the Maximum Transmit PSD #1 to M; and the Maximum Transmit PSD # (N/2+1) to N subfields correspond to the 20 MHz channels from the lowest to the highest frequency, respectively, within a frequency segment that does not include the Primary 20 MHz channel.

Non-EHT STAs shall ignore the Maximum Transmit PSD #X subfields with X>M. The frequency segment that includes the Primary 20 MHz channel includes the BSS bandwidth for non-EHT STAs. The TPE element further includes a Maximum Transmit Power Interpretation subfield that is set to a value indicating Local EIRP PSD or Regulatory client EIRP PSD.

In a third operating example illustrating the second option, the BSS bandwidth is 40 MHz for non-EHT STAs and is 160+160 MHz for EHT STAs. For the entire 320 MHz bandwidth (160+160 MHz), the following maximum transmit PSD is defined: 40 MHz (channel #1, 5) within the secondary 40 MHz channel is punctured so that no transmit is allowed; Non-EHT STAs can only access the P20 and S20 channels (40 MHz); and the maximum transmit PSD for all 20 MHz channels are defined as below:

| | S40 | | P20 | S20 | S80 | | | | | S160 | | | | | | |
|---|---|---|---|---|---|---|---|---|---|---|---|---|---|---|---|---|
| Channel # | 1 | 5 | 9 | 13 | 17 | 21 | 25 | 29 | ... | 41 | 45 | 49 | 53 | 57 | 61 | 65 | 69 |
| Max Transmit PSD [dBm/MHz] | N/A | N/A | 22 | 22.5 | 23 | 23 | 23 | 23 | | 22 | 22 | 22 | 22 | 23 | 23 | 23 | 23 |

Then in a TPE element, N is set to 16 and the Maximum Transmit PSD #1 to 16 subfields are set as below:
  Maximum Transmit PSD #1=44: The lowest frequency channel for non-EHT STA (Channel #=9);
  Maximum Transmit PSD #2=45: The next lowest freq. channel for non-EHT STAs (Channel #=13);
  Maximum Transmit PSD #3 and #4=−128: The 2 lowest freq. channels for EHT STAs except P20 and S20 (Channel #=1, 5) in the P160 MHz bandwidth segment and indicates that channel is punctured;
  Maximum Transmit PSD #5 to #8=46: The next 4 lowest freq. channels for EHT STAs except P20 and S20 (Channel #=17, 21, 25, 29) in the P160 MHz bandwidth segment;
  Maximum Transmit PSD #9 to #12=44: The 4 lowest freq. channels in the S160 MHz bandwidth segment (Channel #=41, 45, 49, 53); and
  Maximum Transmit PSD #13 to #16=46: The next 4 lowest freq. channels in the S160 MHz bandwidth segment (Channel #=57, 61, 65, 69)

In a fourth operation example, the BSS bandwidth is 40 MHz for non-EHT STAs and is 160+160 MHz for EHT STAs. For the entire 320 MHz bandwidth (160+160 MHz), the following maximum transmit PSD is defined: 40 MHz (channel #41, 45) within the secondary 40 MHz channel is punctured so that no transmit is allowed; Non-EHT STAs can only access the P20 and S20 channels (40 MHz); and the maximum transmit PSD for all 20 MHz channels are defined as below:

| | S160 | | | | | | | | S40 | | P20 | S20 | S80 | | | |
|---|---|---|---|---|---|---|---|---|---|---|---|---|---|---|---|---|
| Channel # | 1 | 5 | 9 | 13 | 17 | 21 | 25 | 29 | ... | 41 | 45 | 49 | 53 | 57 | 61 | 65 | 69 |
| Max Transmit PSD [dBm/MHz] | 22 | 22 | 22 | 22 | 23 | 23 | 23 | 23 | | N/A | N/A | 22 | 22.5 | 23 | 23 | 23 | 23 |

Then in a TPE element, N is set to 16 and the Maximum Transmit PSD #1 to 16 subfields are set as below:
  Maximum Transmit PSD #1=44: The lowest frequency channel for non-EHT STA (Channel #=49);
  Maximum Transmit PSD #2=45: The next lowest freq. channel for non-EHT STAs (Channel #=53);
  Maximum Transmit PSD #3 and #4=−128: The 2 lowest freq. channels for EHT STAs except P20 and S20 (Channel #=41, 45) in the P160 MHz bandwidth segment and indicates that channel is punctured;
  Maximum Transmit PSD #5 to #8=46: The next 4 lowest freq. channels for EHT STAs except P20 and S20 (Channel #=57, 61, 65, 69) in the P160 MHz bandwidth segment;
  Maximum Transmit PSD #9 to #12=44: The 4 lowest freq. channels in the S160 MHz bandwidth segment (Channel #=1, 5, 9, 13); and
  Maximum Transmit PSD #13 to #16=46: The next 4 lowest freq. channels in the S160 MHz bandwidth segment (Channel #=17, 21, 25, 29).

An option for sharing the TPE element among EHT and non-EHT STAs with forward compatibility for future generation STAs will now be described. When the BSS bandwidth for non-EHT STAs is set to M*20 MHz and the BSS bandwidth for EHT STAs is set to L*20 MHz, and if the Maximum Transmit Power Count subfield in a TPE element is set to a value indicating that N is greater than M, the Maximum Transmit PSD #1 to M subfields of the TPE element correspond to the 20 MHz channels from the lowest to the highest frequency, respectively, within the BSS bandwidth for non-EHT STAs (containing the primary 20 MHz channel). In this example, the non-EHT STAs are HE STAs. The N is equal to K where K is as defined above. The Maximum Transmit PSD #(M+1) to L subfields correspond to the 20 MHz channels from the lowest to the highest frequency, respectively, within the BSS bandwidth for EHT STAs excluding the 20 MHz channels that have been indicated by the Maximum Transmit PSD #1 to M. For non-EHT STAs shall ignore the Maximum Transmit PSD #X subfields with X>M. For EHT STAs that are not future generation STAs shall ignore the Maximum Transmit PSD #X subfields with X>L. The TPE element further includes a Maximum Transmit Power Interpretation subfield that is set to a value indicating Local EIRP PSD or Regulatory client EIRP PSD.

Another option for sharing the TPE element among EHT and non-EHT STAs with forward compatibility for future generation STAs will now be described. When the BSS bandwidth for non-EHT STAs is set to M*20 MHz and the BSS bandwidth for EHT STAs is set to L*20 MHz, and if the Maximum Transmit Power Count subfield in a TPE element is set to a value indicating that N is greater than M, the Maximum Transmit PSD #1 to M subfields of the TPE element correspond to the 20 MHz channels from the lowest to the highest frequency, respectively, within the BSS bandwidth for non-EHT STAs (containing the primary 20 MHz channel). The non-EHT STAs are HE STAs. The N is equal to K where K is as defined above.

If the BSS bandwidth for EHT STAs is composed of one contiguous frequency segment:
  The Maximum Transmit PSD #(M+1) to L subfields correspond to the 20 MHz channels from the lowest to the highest frequency, respectively, within the BSS bandwidth for EHT STAs excluding the 20 MHz channels that have been indicated by the Maximum Transmit PSD #1 to M.

If the BSS bandwidth for EHT STAs is composed of two non-contiguous frequency segments:
  The Maximum Transmit PSD #(M+1) to (L/2) subfields correspond to the 20 MHz channels from the lowest to the highest frequency, respectively, within a frequency segment that includes the Primary 20 MHz channel excluding the 20 MHz channels that have been indicated by the Maximum Transmit PSD #1 to M; and
  The Maximum Transmit PSD #(L/2+1) to L subfields correspond to the 20 MHz channels from the lowest to the highest frequency, respectively, within a frequency segment that does not include the Primary 20 MHz channel.

Non-EHT STAs shall ignore the Maximum Transmit PSD #X subfields with X>M. EHT STAs that are not future generation STAs shall ignore the Maximum Transmit PSD #X subfields with X>L. The frequency segment that includes the Primary 20 MHz channel includes the BSS bandwidth for non-EHT STAs. The TPE element further includes a Maximum Transmit Power Interpretation subfield that is set to a value indicating Local EIRP PSD or Regulatory client EIRP PSD.

A second solution for providing PSD information to EHT and non-EHT stations includes using a concatenated in a TPE element. When an EHT STA receives a frame from its serving AP it includes a first field indicating that the BSS bandwidth for non-EHT STAs is set to M*20 MHz and a set of second fields, wherein each of the second fields indicates the maximum transmit PSD for corresponding 20 MHz channel, and the EHT STA identifies the maximum transmit PSD of the BSS bandwidth for EHT STAs from the $(M+1)^{th}$ second fields.

An example implementation of this solution will now be described. Each of the first M second fields correspond to each 20 MHz channel within the BSS bandwidth for non-EHT STAs. The first M consecutive second fields indicate the maximum transmit PSD for 20 MHz channels from the lowest to the highest frequency, respectively, within the M*20 MHz BSS bandwidth for non-EHT STAs. The BSS bandwidth for EHT STAs is set to K*20 MHz and the number of second fields is M+K. The BSS bandwidth for EHT STAs is set to K*20 MHz and the number of second fields is equal to or greater than M+K. The BSS bandwidth for EHT STAs is set to K*20 MHz and the number of second fields is equal to or less than M+K.

When the BSS bandwidth for EHT STAs is set to K*20 MHz:
  Each of $(M+1)^{th}$ to $(M+K)^{th}$ second fields correspond to each 20 MHz channel within the BSS bandwidth for EHT STAs;
  $(M+1)^{th}$ to $(M+K)^{th}$ second fields indicates the maximum transmit PSD for 20 MHz channels from the lowest to the highest frequency, respectively, within the K*20 MHz BSS bandwidth for EHT STAs; and
  If the number of the second fields is M+L, where L is less than K, then the $(M+1)^{th}$ to $(M+L)^{th}$ second fields indicates the maximum transmit PSD for 20 MHz channels from the lowest to the highest frequency, respectively, of the primary L*20 MHz of the BSS bandwidth for EHT STAs.

The maximum transmit PSD for 20 MHz channel that $i^{th}$ second field ($1<=i<=M$) indicates is the same as the maximum transmit PSD for 20 MHz channel that $(i+M)^{th}$ second field indicates. The maximum transmit PSD for 20 MHz channel that $i^{th}$ second field ($1<=i<=M$) indicates is the same as or less than the maximum transmit PSD for 20 MHz channel that $(i+M)^{th}$ second field indicates. The maximum transmit PSD for 20 MHz channel that $i^{th}$ second field ($1<=i<=M$) indicates is the same as or greater than the maximum transmit PSD for 20 MHz channel that $(i+M)^{th}$ second field indicates.

The set of second fields are included in a TPE element.

In one embodiment, the first M consecutive second fields are Maximum Transmit PSD #1 to M subfields in a TPE element.

In one embodiment, the Maximum Transmit Power Count subfield in a TPE element is set to a value indicating that N is greater than M.

In one embodiment, when the BSS bandwidth for EHT STAs is set to K*20 MHz, the Maximum Transmit Power Count subfield in a TPE element is set to a value indicating that N is equal to (M+K).

In one embodiment, when the BSS bandwidth for EHT STAs is set to K*20 MHz, the Maximum Transmit Power Count subfield in a TPE element is set to a value indicating that N is equal to or greater than (M+K).

In one embodiment, if N is set to a value that is greater than (M+K), the EHT STA considers the Maximum Transmit PSD #(M+1) to (M+K) for identifying the maximum transmit PSD of the BSS bandwidth for EHT STAs.

In one embodiment, Maximum Transmit Power Interpretation subfield of the TPE element is further set to a value that corresponds to Local EIRP PSD.

In one embodiment, Maximum Transmit Power Interpretation subfield of the TPE element is further set to a value that corresponds to Regulatory client EIRP PSD.

A third solution for providing PSD information to EHT and non-EHT stations includes using a separate TPE element for EHT and non-EHT STAs. For an AP, when the BSS bandwidth of non-EHT STAs is set to M*20 MHz (1<=M<=8), and the BSS bandwidth of EHT STAs is set to K*20 MHz (K>M), the AP transmits a frame including a first element and a second element, wherein the first element indicates the maximum transmit PSD information of BSS bandwidth for non-EHT STAs and the second element indicates the maximum transmit PSD information of BSS bandwidth for EHT STAs that is not covered by the first element.

An example implementation of this solution will now be described. The second element includes K first fields wherein each of K first fields indicates the maximum transmit PSD of each 20 MHz channel that corresponds to the 20 MHz channel from the lowest to the highest frequency, respectively, within the BSS bandwidth for EHT STAs. The first element includes M second fields wherein each of M second fields indicates the maximum transmit PSD of each 20 MHz channel that corresponds to the 20 MHz channel from the lowest to the highest frequency, respectively, within the BSS bandwidth for non-EHT STAs, and the values of the first fields and the second fields are the same for the same 20 MHz channel within the BSS bandwidth for non-EHT STAs. The first element includes M second fields wherein each of M second fields indicates the maximum transmit PSD of each 20 MHz channel that corresponds to the 20 MHz channel from the lowest to the highest frequency, respectively, within the BSS bandwidth for non-EHT STAs, and the values of the first fields is equal to or greater than the values of the second fields for the same 20 MHz channel within the BSS bandwidth for non-EHT STAs. For a 20 MHz channel within the BSS bandwidth for non-EHT STAs, if the maximum transmit PSD value indicated in the first element and the second element is different, an EHT STA identifies the maximum transmit PSD for the 20 MHz channel from the value indicated in the second element. For a 20 MHz channel within the BSS bandwidth for non-EHT STAs, if the maximum transmit PSD value indicated in the first element and the second element is different, an EHT STA identifies the maximum transmit PSD for the 20 MHz channel from the maximum of the values indicated in the first element and the second element corresponding to the 20 MHz channel. For a 20 MHz channel within the BSS bandwidth for non-EHT STAs, if the maximum transmit PSD value indicated in the first element and the second element is different, an EHT STA identifies the maximum transmit PSD for the 20 MHz channel from the minimum of the values indicated in the first element and the second element corresponding to the 20 MHz channel.

Another embodiment of the third option may be implemented as follows. The first element is a first TPE element. The second element is a second TPE element. The second element includes K to M second fields wherein each of (K to M) second fields indicates the maximum transmit PSD of each 20 MHz channel that corresponds to the 20 MHz channels from the lowest to the highest frequency, respectively, within the BSS bandwidth for EHT STAs excluding the BSS bandwidth for non-EHT STAs. The second element is a second TPE element. The K to M second fields are the Maximum Transmit PSD #1 to (K-M) of the second TPE element. The first (and the second) TPE element further includes a Maximum Transmit Power Interpretation field that is set to a value indicating Local EIRP PSD or Regulatory client EIRP PSD.

Another embodiment of the third option may be implemented as follows. The second element includes L (L<K) first fields wherein each of L first fields indicates the maximum transmit PSD of each 20 MHz channel that corresponds to the 20 MHz channel from the lowest to the highest frequency, respectively, of primary L*20 MHz BSS bandwidth for EHT STAs. The second element is a second TPE element. The L first fields are the Maximum Transmit PSD #1 to L of the second TPE element. The Maximum Transmit PSD field value of the second element and of the TPE element shall have the same value for the same 20 MHz channel within the BSS bandwidth of non-EHT STAs. The second element includes L (L<K-M) first fields wherein each of L first fields indicates the maximum transmit PSD of each 20 MHz channel that corresponds to the 20 MHz channel from the lowest to the highest frequency, respectively, of primary L*20 MHz BSS bandwidth for EHT STAs excluding the BSS bandwidth for non-EHT STAs. The second element is a second TPE element. The L first fields are the Maximum Transmit PSD #1 to L of the second TPE element.

A fifth operating example will illustrate the third option. The BSS bandwidth is 40 MHz for non-EHT STAs, and is 160 MHz for EHT STAs. For the entire 160 MHz bandwidth, the following maximum transmit PSD is defined: 40 MHz (channel #1, 5) within the secondary 40 MHz channel is punctured so that no transmit is allowed; Non-EHT STAs can only access the P20 and S20 channels (40 MHz); and The maximum transmit PSD for all 20 MHz channels are defined as below:

|  | S40 | | P20 | S20 | S80 | | | |
|---|---|---|---|---|---|---|---|---|
| Channel # | 1 | 5 | 9 | 13 | 17 | 21 | 25 | 29 |
| Max Transmit PSD [dBm/MHz] | N/A | N/A | 22 | 22.5 | 23 | 23 | 23 | 23 |

In the first element, N=2, and the maximum transmit PSD #1 to 2 are set as:
- Maximum Transmit PSD #1=44: The lowest frequency channel for non-EHT STA (Channel #=9); and
- Maximum Transmit PSD #2=45: The next lowest freq. channel for non-EHT STAs (Channel #=13).

In the second element, N=8, and the maximum transmit PSD #1 to 8 are set as:
- Maximum Transmit PSD #1 and #2=-128: The 2 lowest freq. channels for EHT STAs and indicates that channel is punctured (Channel #=1, 5);
- Maximum Transmit PSD #3=44: The next lowest frequency channel for EHT STA (Channel #=9);
- Maximum Transmit PSD #4=45: The next lowest freq. channel for EHT STAs (Channel #=13); and
- Maximum Transmit PSD #5 to #8=46: The next 4 lowest freq. channels for EHT STAs (Channel #=17, 21, 25, 29).

A sixth operating example will illustrate the third option. The BSS bandwidth is 40 MHz for non-EHT STAs, and is 160 MHz for EHT STAs. For the entire 160 MHz bandwidth, the following maximum transmit PSD is defined: 40 MHz (channel #1, 5) within the secondary 40 MHz channel is punctured so that no transmit is allowed; Non-EHT STAs can only access the P20 and S20 channels (40 MHz); and the maximum transmit PSD for all 20 MHz channels are defined as below:

|           | S40 |   | P20 | S20 |    | S8 | 0  |    |
|-----------|-----|---|-----|-----|----|----|----|----|
| Channel # | 1   | 5 | 9   | 13  | 17 | 21 | 25 | 29 |
| Max Transmit PSD [dBm/MHz] | N/A | N/A | 22 | 22.5 | 23 | 23 | 23 | 23 |

In the first element, N=2, and the maximum transmit PSD #1 to 2 are set as:
Maximum Transmit PSD #1=44: The lowest frequency channel for non-EHT STA (Channel #=9); and
Maximum Transmit PSD #2=45: The next lowest freq. channel for non-EHT STAs (Channel #=13).

In the second element, N=6, and the maximum transmit PSD #1 to 6 are set as:
Maximum Transmit PSD #1 and #2=-128: The 2 lowest freq. channels for EHT STAs and indicates that channel is punctured (Channel #=1, 5); and
Maximum Transmit PSD #5 to #8=46: The next 4 lowest freq. channels for EHT STAs except P20 and S20 (Channel #=17, 21, 25, 29).

Figure 9:
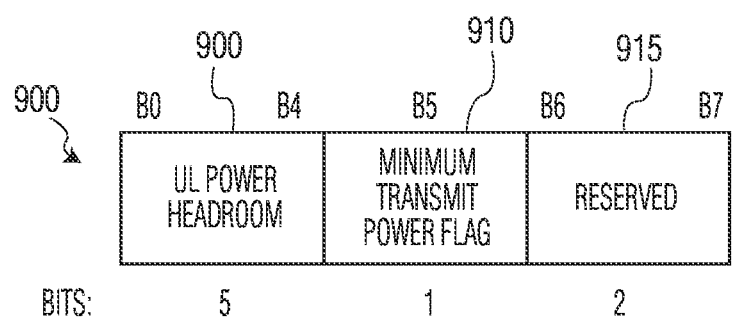
FIG. 9 illustrates a control information subfield format in an uplink power headroom (UPH) control subfield.

In IEEE 802.11ax an uplink power headroom report is defined. FIG. 9 illustrates a control information subfield format in an uplink power headroom (UPH) control subfield. The Control Information subfield 900 in an UPH Control subfield of an MAC protocol data unit (MPDU) contains the UL power headroom (UPH) used for power pre-correction. The UL Power Headroom subfield 905 include five bits that indicate the available UL power headroom, in units of dB, for the current HE-MCS. The UL Power Headroom subfield 905 carries a value 0 to 31 that maps to 0 dB to 31 dB. The Minimum Transmit Power Flag subfield 910 includes on bit that is set to 1 to indicate that the minimum transmit power for the current HE-MCS is reached by the STA and set to 0 otherwise. The last two bits 915 are reserved.

How the uplink power headroom information is uses will now be described. The STA that transmits an HE trigger based PHY protocol data unit (PPDU) transits the dB value of its UL power headroom, $HR_{STA}$, in the UPH control subfield of frame (that can carry and HE-variant HT control field) carried in the HE TB PPDU, to assist in the AP's HE-Modulation and Coding Scheme (HE-MCS) selection. The UL power headroom for the assigned HE-MCS is defined in the following equation:

$$HR_{STA} = Tx_{pwr}^{Max} - Tx_{pwr}^{STA},$$

where $Tx_{pwr}^{Max}$ represents the maximum UL transmit power of an HE TB PPDU with the assigned HE-MCS after considering hardware capability, regulatory requirements and local maximum transmit power levels, as well as non-802.11 in-device coexistence requirements; $Tx_{pwr}^{STA}$ represents the current UL transmit power of the HE TB PPDU for the assigned HE-MCS, which is determined by power control and subject to the non-AP STA's capabilities and other requirements; and $HR_{STA}$ is the UL power headroom, in DB, of the HE TB PPDU, the encoding of which is specified in the UPH control section of the 802.11ax specification.

During the standardization of IEEE 802.11ax and 802.11be, it has been decided that an AP may broadcast different (local or regulatory) maximum transmit power spectral density (PSD) for different 20 MHz channels of the AP's BSS bandwidth. This case can happen more frequently in the 6 GHz band when the AP is an automated frequency coordination (AFC) AP, in which case the AP may adjust its transmit power such that its transmission will not interfere with an incumbent user. The current FCC rules and guidelines for incumbent user protection include the following:

An AFC system must establish location and frequency-based exclusion zones around fixed microwave receivers;
Include both co-channel and adjacent channel exclusion zones;
Interference Protection Criteria: −6 dB I/N; and
Propagation model of: 0 to 30 meters: free space pathloss; more than 30 meters to one kilometer: WINNER II model; more than one kilometer: Irregular Terrain Model (ITM)+clutter model.

As an AP's maximum transmit PSD can be different on different 20 MHz channels of the BSS bandwidth, a non-AP STA's maximum transmit PSD can be different on different 20 MHz channel of the BSS bandwidth, as well. For example, based on FCC's rules on 6 GHz operation, a STA's maximum transmit power is 6 dB lower than associated AP's transmit power.

This ability raises the following issues. If the maximum transmit PSD for different 20 MHz channels of the BSS bandwidth is different, current UL power headroom information does not reflect available transmit power of a STA, especially when the maximum transmit PSD for different segment of the HE TB PPDU is different. This may be illustrated using the following operational example. If a TB PPDU occupies 40 MHz BW, where the P_max for the lower 20 MHz is 1 mW and for the higher 20 MHz is 2 mW, and further assume that the TB PPDU uses the transmit power of 1 mW for both lower and higher 20 MHz, respectively. In this case, based on current definition, the STA needs to report the power headroom to be 1 mW (2 mW is used out of 1 mW+2 mW maximum). However, from the STA's actual transmit power capability perspective, as the TB PPDU already reaches the maximum for the lower 20 MHz channel, the STA cannot raise its transmit power any further. Therefore, reporting the power headroom of 1 mW gives wrong information to the serving AP.

A first solution to this problem is to redefine P_max. When a STA transmits a PPDU with a first transmission bandwidth, wherein the first transmission bandwidth is composed of a set of disjoint frequency segments, and wherein the maximum transmit PSD for each disjoint frequency segment can be different, the STA calculates the power headroom information based on the maximum (UL) transmit power of the PPDU that is defined as a function of the maximum (UL) transmit powers on each disjoint frequency segment of the PPDU.

The following are various different approaches to redefining P_max.

The function of the maximum (UL) transmit powers of the PPDU on each disjoint frequency segment is the minimum value among the maximum transmit power spectral density (PSD) for each disjoint frequency segment multiplied by the first transmission bandwidth. The multiplication is done in linear scale.

The function of the maximum (UL) transmit powers of the PPDU on each disjoint frequency segment is the maximum value among the maximum transmit PSD for each disjoint frequency segment multiplied by the first transmission bandwidth. The multiplication is done in linear scale.

The function of the maximum (UL) transmit powers of the PPDU on each disjoint frequency segment is the average value among the maximum transmit PSD for each disjoint frequency segment multiplied by the first transmission bandwidth. The multiplication is done in linear scale.

The bandwidth of each disjoint frequency segment is the same, and the function of the maximum (UL) transmit powers of the PPDU on each disjoint frequency segment is the minimum value among the maximum transmit power for each disjoint frequency segment multiplied by the number of disjoint frequency segment in the first transmission bandwidth.

Bandwidth of each disjoint frequency segment is 20 MHz.

The first transmission bandwidth includes a first set of disjoint frequency segment, wherein no transmission power is allocated in the first set of disjoint frequency segment, and wherein the first set of disjoint frequency segment is not included in calculating the power headroom information.

The first set of disjoint frequency segment implies punctured channels.

The following operation example illustrates how P_max may be redefined. A STA's transmit bandwidth for a PPDU in a BSS is 160 MHz, and for each 20 MHz within the transmit bandwidth, the following maximum transmit PSD [dBm/MHz] is defined (considering the STA's capabilities, regulations, etc.). The STA's maximum transmit PSD is 10 dBm/MHz for each 20 MHz channel. Due to protection for the incumbent users, maximum transmit PSD for secondary 80 MHz (S80) is limited to 0 dBm/MHz as follows:

| Channel Index | 0 | 1 | 2 | 3 | 4 | 5 | 6 | 7 |
|---|---|---|---|---|---|---|---|---|
| Channel Structure | S20 | P20 | S40 | | S80 | | | |
| Max. Tx. Power [dBm/MHz] | 10 | 10 | 10 | 10 | 0 | 0 | 0 | 0 |

The STA calculates the maximum (UL) transmit power of the PPDU based on the minimum value of the maximum transmit PSD for each 20 MHz, i.e., P_max=min {10, 10, 10, 10, 0, 0, 0, 0}+10 log(160)=22 dBm.

A second solution to this problem is to specify a minimum PHR per segment. When a STA transmits a PPDU with a first transmission bandwidth, wherein the first transmission bandwidth is composed of a set of disjoint frequency segments, and wherein the maximum transmit PSD for each disjoint frequency segment can be different, the STA calculates the power headroom information from a function of the power headroom on each disjoint frequency segment.

The following are various different approaches to specifying a minimum PHR per segment.

The function of the power headroom on each disjoint frequency segment is the minimum value among the power headroom on each disjoint frequency segment.

The function of the power headroom on each disjoint frequency segment is the maximum value among the power headroom on each disjoint frequency segment.

The function of the power headroom on each disjoint frequency segment is the average value among the power headroom on each disjoint frequency segment.

Bandwidth of each disjoint frequency segment is 20 MHz.

The function of the power headroom may be defined as follows:

$$HR_{STA} = \min_{i}\{Tx_{pwr,i}^{Max} - Tx_{pwr,i}^{STA}\},$$

where: $Tx_{pwr,i}^{Max}$ represents the maximum UL transmit power of the PPDU with the assigned MCS level for the $i^{th}$ frequency segment within the PPDU transmit bandwidth after considering hardware capability, regulatory requirements and local maximum transmit power levels, as well as non-802.11 in-device coexistence requirements; $Tx_{pwr,i}^{STA}$ represents the current UL transmit power of the PPDU for the assigned MCS level for the $i^{th}$ frequency segment within the PPDU transmit bandwidth, which is determined by power control and subject to the STA's capabilities and other requirements; and $HR_{STA}$ is the UL power headroom, in dB, of the PPDU.

The first transmission bandwidth includes a first set of disjoint frequency segment, wherein no transmission power is allocated in the first set of disjoint frequency segment, and wherein the first set of disjoint frequency segment is not included in calculating the power headroom information. The first set of disjoint frequency segment implies punctured channels.

The following operation example illustrates how to specify the minimum PHR per segment. A STA's transmit bandwidth for a PPDU in a BSS is 160 MHz, and for each 20 MHz within the transmit bandwidth, the following maximum transmit power [dBm] and the actual transmit power [dBm] is given:

The STA's maximum transmit PSD is 20 dBm for each 20 MHz channel;

Due to protection for the incumbent users, maximum transmit power for secondary 80 MHz (S80) is limited to 10 dBm for each 20 MHz channel; and The STA transmits the PPDU with 10 dBm for each 20 MHz within the transmit bandwidth.

The following table illustrates this approach.

| Channel Index | 0 | 1 | 2 | 3 | 4 | 5 | 6 | 7 |
|---|---|---|---|---|---|---|---|---|
| Channel Structure | S20 | P20 | S40 | | S80 | | | |
| Max. Tx. Power [dBm] for the channel | 20 | 20 | 20 | 20 | 10 | 10 | 10 | 10 |
| Actual Tx Power [dBm] for the channel | 10 | 10 | 10 | 10 | 10 | 10 | 10 | 10 |
| Power Headroom for the channel [dB] | 10 | 10 | 10 | 10 | 0 | 0 | 0 | 0 |

The power headroom for each channel is calculated as {10, 10, 10, 10, 0, 0, 0, 0} [dB]. The STA calculates the power headroom the PPDU based on the minimum value of the power headroom for each 20 MHz channel: HR_STA=min {10, 10, 10, 10, 0, 0, 0, 0}=0 [dB].

Embodiments for 'EHT power control will now be described. In a EHT BSS, both HE STAs and EHT STAs may associate with the EHT AP. The EHT BSS may have different TX power restrictions at different 20 MHz channels of its BSS operating channel when the BSS operating channel covers different operating bands or due to different incumbent operations in different 20 MHz channels. Some 20 MHz channels of the operating channel in an EHT BSS can be punctured. However the associated HE STAs do not understand such announcement.

An EHT AP can announce different allowed TX power for different subchannels (a subchannel is a group of continuous 20 MHz channels). When the allowed TX power becomes 0 for a subchannel, the subchannel is punctured from the BSS operating channel. An EHT AP may announce different allowed TX power levels for EHT STA and HE STA at the same subchannel.

Figure 10:
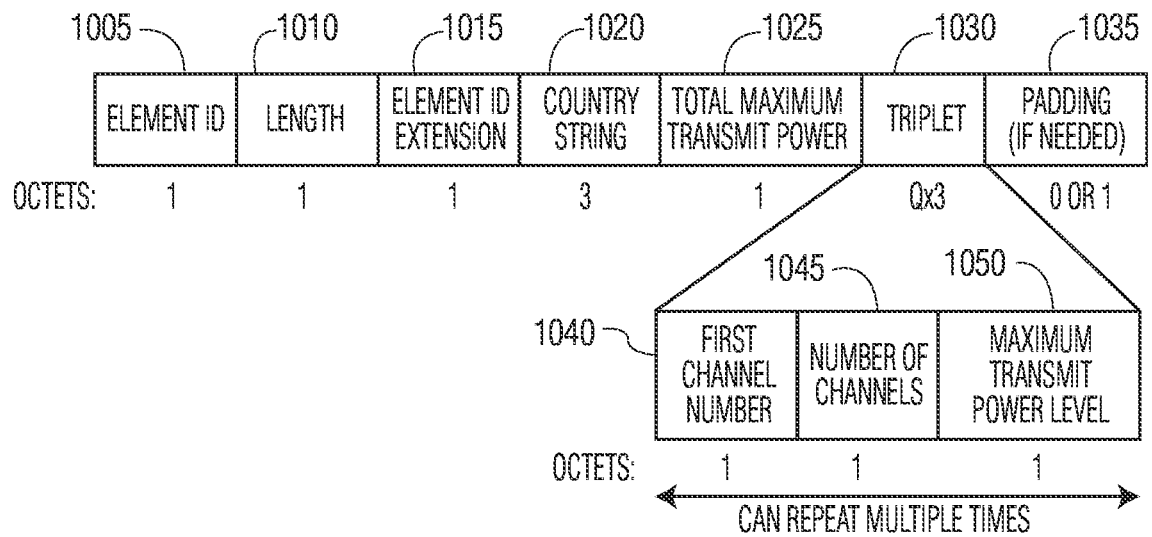
FIG. 10 illustrates the enhanced TX power element that defines the maximum TX power for EHT STAs in each subchannel allowed by regulation.

A first solution to announce the different allowed TX power levels that includes implementing a subchannel maximum TX power and subchannel maximum TX power constraint will now be described. A new element (e.g., Enhanced TX Power element) may be defined to specify the maximum TX power for EHT STAs in each subchannel allowed by regulation. FIG. 10 illustrates the enhanced TX power element 1000 that defines the maximum TX power for EHT STAs in each subchannel allowed by regulation. The enhanced TX power element 1000 includes an element ID 1005, a length 1010, an element ID extension 1015, a country string 1020, total maximum transmit power 1025, one or more triplets of octets 1030, and padding 1035 if needed. The triplet of octets includes a first channel number 1040, a number of channels 1045, and a maximum transmit power level 1050. One variant is that the Country String 1020 may be deleted. Another variant is that the whole BSS has one maximum transmit power level in PSD (dbm/MHz). The Total Maximum Transmit Power 1025 is the unsigned integer in units of decibel that defines the maximal allowed TX power for the total 20 MHz channels being used. The Maximum Transmit Power Level 1050 is the unsigned integer in units of decibel per MHz (PSD(dbm/MHz)) for the related channel segments defined by the related First Channel Number 1040 and Number of Channels 1045 (the number of 20 MHz channels).

When a BW that is less than the BSS operating BW is used for a PPDU transmission, the TX power is no more than the Total Maximum Transmit Power 1025 and is no more than the transmit power calculated per the Maximum Transmit Power Level (PSD) 1050. The calculated transmit power could be based on the minimal transmit power PSD of all subchannels covered by the unpunctured 20 MHz channels of the PPDU.

One embodiment is that if a 20 MHz channel of the BS operating channel is not covered by Enhanced TX Power element 1000, the 20 MHz channel is punctured.

Figure 11:
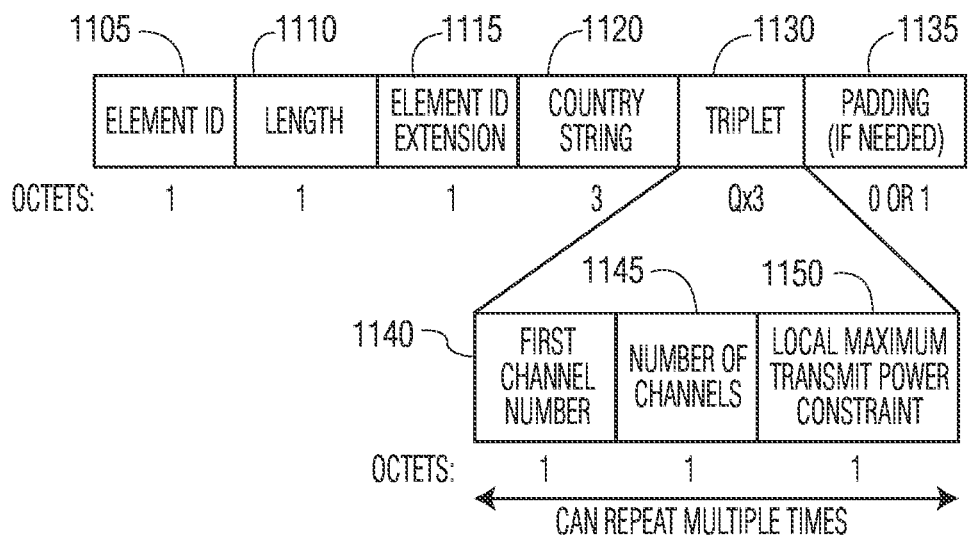
FIG. 11 illustrates the enhanced local TX power constraint element that defines the maximum TX power and subchannel maximum TX power constraint.

Further, a new element (e.g., Enhanced Local TX Power Constraint element) defines the TX power constraint for EHT STA in each subchannel. FIG. 11 illustrates the enhanced local TX power constraint element 1100 that defines the maximum TX power and subchannel maximum TX power constraint. The enhanced local TX power constraint element 1100 includes an element ID 1105, a length 1110, an element ID extension 1115, country string 1120, one or more triplets of octets 1130, and padding 1135 if needed. The triplet of octets includes a first channel number 1140, a number of channels 1145, and a local maximum transmit power constraint 1150. The Local Maximum Transmit Power Constraint 1150 is the unsigned integer in units of decibel per MHz (dbm/MHz). The allowed TX power of a BW for EHT STA is thus the minimal value of: Total Maximum Transmit Power 1025; and the transmit power calculated per the Maximal Transmit Power Level 1050 of the subchannel in the Enhanced TX Power element 1000 minus the Local Maximum Transmit Power Constraint 1150 of the subchannel of the Enhanced Local TX Power Constraint element 1150. The calculated transmit power could be based on the minimal allowed transmit power PSD (the difference of maximal transmit power level 1050 and local maximum transmit power constraint 1150) of all subchannels covered by the unpunctured 20 MHz channels of the PPDU When the allowed TX power of a subchannel becomes 0, the subchannel is punctured. One variant to this is that whole BSS has one maximum transmit power level constraint in PSD (dbm/MHz). Another variant is that the punctured 20 MHz channels are described by a bitmap of 20 MHz channels where each bit is related to a 20 MHz channel and a value 1 of a bit indicates that the related 20 MHz channel is punctured.

The baseline TX power related element, e.g., Transmit Power Envelop element 1000 defines the allowed maximum TX power for non-EHT STAs. For the same subchannel, the EHT AP can announce different TX power for non-EHT STAs and EHT STAs through the enhanced elements and baseline elements.

Figure 12:
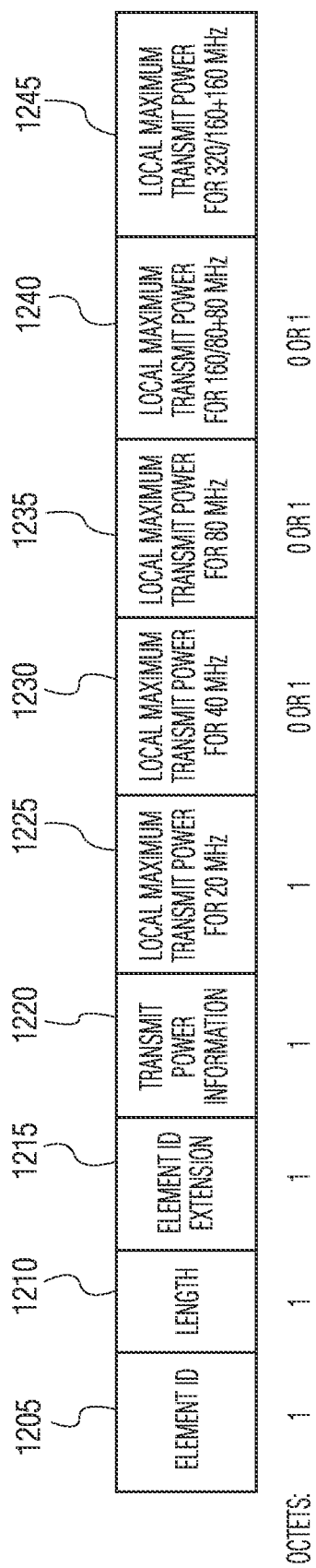
FIG. 12 illustrates the allowed local TX power element.

A second solution to announce the different allowed TX power levels that includes implementing a subchannel maximum TX power and subchannel maximum TX power constraint will now be described. A new element, the Allowed Local TX Power element, defines the local maximum allowed TX power of associated STA for different BWs. FIG. 12 illustrates the allowed local TX power element 1200. The allowed local TX power element 1200 includes an element ID 1205, a length 1210, an element ID extension 1215, a transmit power information 1220, a local maximum transmit power for 20 MHz 1225, a local maximum transmit power for 40 MHz 1230, a local maximum transmit power for 80 MHz 1235, a local maximum transmit power for 160/80+80 MHz 1240, and a local maximum transmit power for 320/160+160 MHz 1245.

Figure 13:
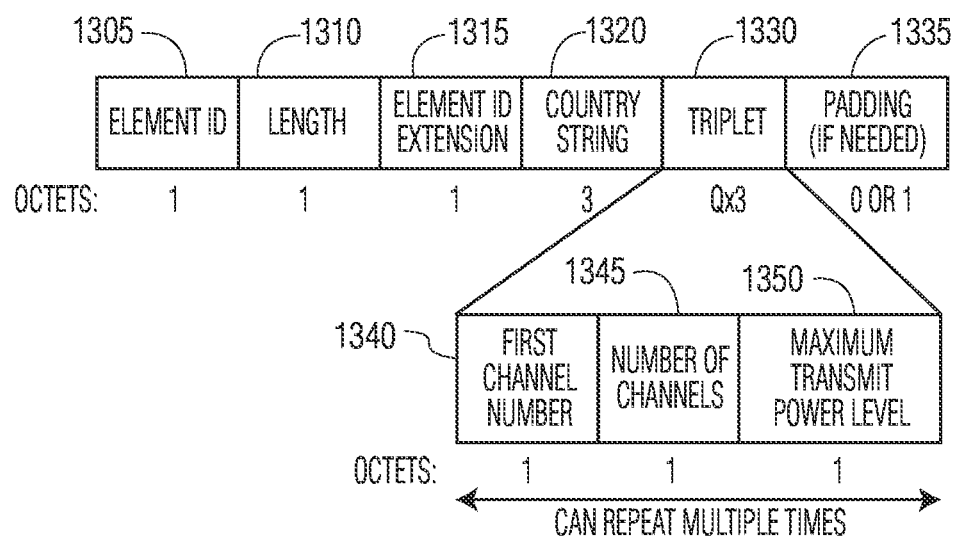
FIG. 13 illustrates the enhanced TX power element that defines the maximum TX power and subchannel maximum TX power constraint.

A new element, an Enhanced TX Power element, defines the maximum TX power per MHz for EHT STA in each subchannel allowed by regulation. FIG. 13 illustrates the enhanced TX power element 1300 that defines the maximum TX power and subchannel maximum TX power constraint. The enhanced TX power element 1300 includes an element ID 1305, a length 1310, an element ID extension 1315, country string 1320, one or more triplets of octets 1330, and padding 1335 if needed. The triplet of octets includes a first channel number 1340, a number of channels 1345, and a maximum transmit power level 1350. The maximum transmit power level 1350 is the unsigned integer in units of decibel per MHz (dbm/MHz) for the related channel segments defined by the related First Channel Number 1340 and Number of Channels 1345 (the number of 20 MHz channels). In a selected BW (20, 40, 80, 160/80+80, 320/160+160 MHz), the TX power is no more than the local maximum allowed TX power of the BW defined by Allowed Local TX Power element and is no more than the transmit power calculated per the Maximum Transmit Power Level 1350 (PSD). One embodiment is that if a 20 MHz channel of the BS operating channel is not covered by Enhanced TX Power element 1300, the 20 MHz channel is punctured.

A new element, an Enhanced Local TX Power Constraint element, defines the TX power constraint for EHT STA in each subchannel. The form of the enhanced local TX power constraint element is the same as that illustrated in FIG. 11. The Local Maximum Transmit Power Constraint 1150 is the unsigned integer in units of decibel per MHz (dbm/MHz). The allowed TX power of a selected BW for EHT STA is thus the minimal value of: the local maximum allowed TX power of the BW defined by Allowed Local TX Power element; and the transmit power calculated per the Maximal Transmit Power Level of the subchannel in the Enhanced TX Power element minus the Local Maximum Transmit Power Constraint of the subchannel of the Enhanced Local TX Power Constraint element. When the allowed TX power of a subchannel becomes 0, the subchannel is punctured. The baseline TX power related element, e.g., Transmit Power Envelop element defines the allowed maximum TX power for non-EHT STAs. For the same subchannel, the EHT AP can announce different TX power for non-EHT STAs and EHT STAs through the enhanced elements and baseline elements.

Puncture support in HE and EHT will now be described. One embodiment is that both HE and EHT have same transmit power information. If the BSS operating BW is no more than 160/80+80 MHz, the EHT operating parameters and HE operating parameters announce the same BW. If EHT operating parameters announce >160/80+80 MHz BW, the HE operating parameters announce 160/80+80 MHz BW. If a HE STA is the TXOP holder through backoff, the STA can only use the BW that does not cover the punctured 20 MHz channel announced by its associated AP to transmit frames. An HE AP can allocate DL RU to a HE STA in any unpunctured 20 MHz channels covered by STA's operating BW when DL MU covers punctured 20 MHz channels. An HE AP can allocate a UL RU to a HE STA in any unpunctured 20 MHz channels covered by STA's operating BW when the solicited HE TB PPDU covers punctured 20 MHz channels.

A first option for HE static channel puncture within a BSS operating channel will now be described. An HE/EHT AP can announce the punctured 20 MHz channels within its BSS operating channel or channel segments with the following restriction through Local/Regulatory EIRP PSD: the punctured 20 MHz channels are in line with at least one of the dynamic channel puncture case with the bandwidth (channel or channel segments) announced by the HE Operating element. An HE STA associated with the AP can use the channel with primary 20 MHz channel that does not cover any punctured 20 MHz channel to initiate its frame transmission within the UL HE SU or UL HE MU PPDU. In DL HE MU PPDU, the AP allocates an RU with no covered punctured 20 MHz channel to an HE STA. In Trigger frame, the AP allocates an RU with no covered punctured 20 MHz channel to a STA for its TB PPDU transmission.

When using MU-RTS/CTS to protect the TXOP, the following can be done:
  Option 1: Each 20 MHz channel used for data transmission has at least one STA to transmit CTS in it; an HE AP can allocate some RUs with no covered punctured 20 MHz channel that do not cover primary 20 MHz channel to the solicited STAs; and at least one STA's RU with no covered punctured 20 MHz channel will cover the primary 20 MHz channel.
  Option 2: some 20 MHz channel used for data transmission may have no STA to transmit CTS in it; an HE AP cannot allocate any RU with no covered punctured 20 MHz channel that does not cover primary 20 MHz channel to a STA; all the allocated RUs cover the primary 20 MHz channel and have no punctured 20 MHz channels.

A first option for HE static channel puncture within a BSS operating channel will now be described. An HE/EHT AP can announce the punctured 20 MHz channels within its BSS operating channel or channel segments with the following restriction through Local/Regulatory EIRP PSD: the primary 20 MHz channel cannot be punctured. An HE STA associated with the AP can use the channel with primary 20 MHz channel that does not cover any punctured 20 MHz channel to initiate its frame transmission within the UL HE SU or UL HE MU PPDU. In DL HE MU PPDU, the AP allocates an RU with no covered punctured 20 MHz channel to an HE STA. In Trigger frame, the AP allocates an RU with no covered punctured 20 MHz channel to a STA for its TB PPDU transmission.

When using MU-RTS/CTS to protect the TXOP, the following can be done:
  Option 1: each 20 MHz channel used for data transmission has at least one STA to transmit CTS in it; an HE AP can allocate some RUs with no covered punctured 20 MHz channel that do not cover primary 20 MHz channel to the solicited STAs; and at least one STA's RU with no covered punctured 20 MHz channel will cover the primary 20 MHz channel.
  Option 2: some 20 MHz channel used for data transmission may have no STA to transmit CTS in it; an HE AP cannot allocate any RU with no covered punctured 20 MHz channel that does not cover primary 20 MHz channel to a STA; and all the allocated RUs cover the primary 20 MHz channel and have no punctured 20 MHz channels.

Separate transmit power envelope element for EHT STAs will now be described. The EHT Local EIRP and EHT Regulatory EIRP define the maximal Tx power of BW 20, 40, 80, 160, 320 MHz with the BSS operating BW 320 MHz. An EHT STA ignore the Tx power information for the 20 MHz channels that are not covered by EHT BSS operating BW.
  Option 1: if Maximum Transmit Power Count subfield has value more than 4, the first 5 fields in Maximum Transmit Power are for primary 20, 40, 80, 160 320 MHz when Maximum Transmit Power Interpretation subfield is 4 or 6.
  Option 2: the 5 fields in Maximum Transmit Power for primary 20, 40, 80, 160 320 MHz covered by EHT BSS operating BW are decided by the >320 channelization, e.g. 320 MHz EHT operating BW in >320 MHz NG-EHT operating BW.

When EHT Local (Regulatory) EIRP is announced, the Local (Regulatory) EIRP will announce Tx power for BW<=160 MHz. The maximum Tx powers of 20, 40, 80, 160 MHz EHT Local (Regulatory) EIRP are same as the maximum Tx powers of 20, 40, 80, 160 MHz Local (Regulatory) EIRP respectively.

Another embodiment of separate transmit power envelope element for EHT STAs will now be described. The EHT Local EIRP PSD and EHT Regulatory EIRP PSD define the maximal Tx power PSD of every 20 MHz channel within the BW 20, 40, 80, 160, 320 MHz, >320 MHz. A EHT STA ignore the Tx power information for the 20 MHz channels that are not covered by EHT BSS operating BW:
  Option 1: if Maximum Transmit Power Count subfield has value more than 5 (in such case, the first 16 fields in Maximum Transmit Power are for 20 MHz channels in primary 320 MHz) when Maximum Transmit Power Interpretation subfield is 5 or 7.
  Option 2: the 20 MHz channels covered by EHT BSS operating BW are decided by the >320 channelization, e.g. 320 MHz EHT operating BW in >320 MHz NG-EHT operating BW.

When Local (Regulatory) EIRP PSD can announce channel puncture and EHT Local (Regulatory) EIRP PSD is announced, the Local (Regulatory) EIRP will announce Tx power PSD of each 20 MHz channel within BW 160 MHz. The maximum EIRP PSD of every 20 MHz channel within the primary 160 MHz channel defined in EHT Local (Regulatory) EIRP are same as the maximum EIRP PSD of every 20 MHz channel defined in Local (Regulatory) EIRP respectively. When Local (Regulatory) EIRP PSD cannot announce channel puncture and EHT Local (Regulatory) EIRP PSD is announced, the Local (Regulatory) EIRP will announce Tx power PSD of each 20 MHz channel within HE BSS operating BW. The maximum EIRP PSD of every 20 MHz channel within HE BSS operating BW defined in EHT Local (Regulatory) EIRP are same as the maximum EIRP PSD of every 20 MHz channel defined in Local (Regulatory) EIRP respectively.

Using the same transmit power envelope element for EHT and HE STAs will now be described. The Local EIRP and Regulatory EIRP define the maximal Tx power of BW 20, 40, 80, 160, 320 MHz, >320 MHz. An EHT STA ignore the Tx power information for the 20 MHz channels that are not covered by EHT BSS operating BW.

Option 1: if Maximum Transmit Power Count subfield has value more than 4, the first 5 fields in Maximum Transmit Power are for primary 20, 40, 80, 160 320 MHz when Maximum Transmit Power Interpretation subfield is 0 or 2.

Option 2: the 5 fields in Maximum Transmit Power for primary 20, 40, 80, 160 320 MHz covered by EHT BSS operating BW are decided by the >320 channelization, e.g. 320 MHz EHT operating BW in >320 MHz NG-EHT operating BW.

An HE STA ignore the Tx power information for the 20 MHz channels that are not covered by HE BSS operating BW. Another embodiment of using the same transmit power envelope element for EHT and HE STAs will now be described. The Local EIRP PSD and EHT Regulatory EIRP PSD define the maximal Tx power of every 20 MHz channel within BW 20, 40, 80, 160, 320 MHz, >320 MHz. An EHT STA ignore the Tx power information for the 20 MHz channels that are not covered by EHT BSS operating BW e.g., if Maximum Transmit Power Count subfield has value more than 5 (in such case, the first 16 fields in Maximum Transmit Power are for 20 MHz channels in primary 320 MHz) when Maximum Transmit Power Interpretation subfield is 1 or 3. An HE STA ignore the Tx power information for the 20 MHz channels that are not covered by HE BSS operating BW.

The system and method described herein may be carried out using specific hardware to perform the actions or software running on a processor may implement the embodiments. The processor may be connected to memory and storage, where the software instructions are stored in the storage. The processor may be any general purpose processor, a graphics processor, a signal processor, or any other type of specialized processor.

Any combination of specific software running on a processor to implement the embodiments of the invention, constitute a specific dedicated machine.

As used herein, the term "non-transitory machine-readable storage medium" will be understood to exclude a transitory propagation signal but to include all forms of volatile and non-volatile memory.

It should be appreciated by those skilled in the art that any block diagrams herein represent conceptual views of illustrative circuitry embodying the principles of the invention.

Although the various exemplary embodiments have been described in detail with particular reference to certain exemplary aspects thereof, it should be understood that the invention is capable of other embodiments and its details are capable of modifications in various obvious respects. As is readily apparent to those skilled in the art, variations and modifications can be affected while remaining within the spirit and scope of the invention. Accordingly, the foregoing disclosure, description, and figures are for illustrative purposes only and do not in any way limit the invention, which is defined only by the claims.

What is claimed is:

1. A method performed by a station to identify a maximum allowed transmit power spectral density (PSD) of a basic service set (BSS), comprising: receiving, by the station, a first field from an access point (AP) of the BSS, wherein the first field indicates that the BSS bandwidth is set to M times a unit channel bandwidth; receiving, by the station, a set of second fields from the AP, wherein the set of second fields includes K fields corresponding to K channels and wherein each of the K second fields indicates the maximum allowed transmit PSD for the K channels and the bandwidth of the channel is the unit channel bandwidth, and identifying, by the station, the maximum allowed transmit PSD of the M channels of the BSS bandwidth from the first M consecutive second fields, wherein the BSS bandwidth is a BSS bandwidth for non-EHT stations, an EHT BSS bandwidth is K times the unit channel bandwidth, the station uses M+1 to K second subfields to identify the maximum allowed transmit PSD of the EHT BSS bandwidth outside of the BSS bandwidth, and wherein the station is an EHT station.

2. The method of claim 1, wherein the first M consecutive second fields indicates the maximum allowed transmit PSD for unit channels from the lowest to the highest frequency, respectively, within the BSS bandwidth for non-EHT STAs.

3. The method of claim 2, wherein the unit channel bandwidth is 20 MHz.

4. The method of claim 1, wherein the set of second fields are included in a transmit power envelope (TPE) element.

5. The method of claim 1, wherein the set of second fields are included in a transmit power envelope (TPE) element, and wherein the first M consecutive second fields are maximum allowed transmit PSD X subfields in the TPE, where X is a positive integer where 1 X M.

6. The method of claim 1, wherein the station ignores the M+1 to K second fields when the station is a non-EHT station.

7. The method of claim 1, wherein M+1 to K second subfields to identify the maximum allowed transmit PSD of the EHT BSS bandwidth outside of the BSS bandwidth are ordered from the lowest to the highest frequency, within the EHT BSS bandwidth.

8. The method of claim 2, wherein the set of second fields are included in a transmit power envelope (TPE) element which includes a maximum allowed transmit power interpretation subfield that is set to a value indicating a local effective isotropically radiated power (EIRP) PSD or a regulatory client EIRP PSD.

9. A station configured to identify a maximum allowed transmit power spectral density (PSD) of a basic service set (BSS), comprising: a receiver configured to receive a first field from an access point (AP) of the BSS, wherein the first field indicates that the BSS bandwidth is set to M times a unit channel bandwidth, and receive a set of second fields from the AP, wherein the set of second fields includes K fields corresponding to K channels and wherein each of the K second fields indicates the maximum allowed transmit PSD for the K channels and the bandwidth of the channel is the unit channel bandwidth, and a processor configured to identify the maximum allowed transmit PSD of the M channels of the BSS bandwidth from the received first M consecutive second fields, wherein the BSS bandwidth is a BSS bandwidth for non-EHT stations, an EHT BSS bandwidth is K times the unit channel bandwidth, the station uses M+1 to K second subfields to identify the maximum allowed transmit PSD of the EHT BSS bandwidth outside of the BSS bandwidth, and wherein the station is an EHT station.

10. The station of claim 9, wherein the first M consecutive second fields indicates the maximum allowed transmit PSD for unit channels from the lowest to the highest frequency, respectively, within the BSS bandwidth for non-EHT STAs.

11. The station of claim 10, wherein the channel bandwidth is 20 MHz.

12. The station of claim 9, wherein the set of second fields are included in a transmit power envelope (TPE) element.

13. The station of claim 10, wherein the set of second fields are included in a transmit power envelope (TPE) element, and wherein the first M consecutive second fields are maximum allowed transmit PSD X subfields in the TPE, where X is a positive integer where 1 X M.

14. The station of claim 9, wherein the station ignores the M+1 to K second fields when the station is a non-EHT station.

15. The station of claim 9, wherein M+1 to K second subfields to identify the maximum allowed transmit PSD of the EHT BSS bandwidth outside of the BSS bandwidth are ordered from the lowest to the highest frequency, within the EHT BSS bandwidth.

16. The station of claim 10, wherein the set of second fields are included in a transmit power envelope TPE} element which includes a maximum allowed transmit power interpretation subfield that is set to a value indicating a local effective isotropically radiated power (EIRP) PSD or a regulatory client EIRP PSD.

17. A method performed by an access point to advertise a maximum allowed transmit power spectral density (PSD) of a basic service set (BSS) to a station, comprising: transmitting, by the AP, a first field from to a station of the BSS, wherein the first field indicates that the BSS bandwidth is set to M times a unit channel bandwidth, transmitting, by the AP, a set of second fields from to the station, wherein the set of second fields includes K fields corresponding to K channels and wherein each of the K second fields indicates the maximum allowed transmit PSD for the K channels and the bandwidth of the channel is the unit channel bandwidth, and receiving from the station a frame wherein the maximum allowed transmit PSD of the M channels of the BSS bandwidth is based upon first M consecutive second fields, wherein the BSS bandwidth is a BSS bandwidth for non-EHT stations, an EHT BSS bandwidth is K times the unit channel bandwidth, the M+1 to K second fields indicate the maximum allowed transmit PSD of the EHT BSS bandwidth outside of the BSS bandwidth, and wherein the station is an EHT station.

18. The method of claim 17, wherein the first M consecutive second fields indicates the maximum allowed transmit PSD for unit channels from the lowest to the highest frequency, respectively, within the BSS bandwidth for non-EHT STAs.

19. The method of claim 18, wherein the channel bandwidth is 20 MHz.

20. The method of claim 17, wherein the set of second fields are included in a transmit power envelope (TPE) element.

21. The method of claim 18, wherein the set of second fields are included in a transmit power envelope (TPE) element, and wherein the first M consecutive second fields are maximum allowed transmit PSD X subfields in the TPE, where X is a positive integer where 1<X<M.

22. The method of claim 17, wherein M+1 to K second subfields to identify the maximum allowed transmit PSD of the EHT BSS bandwidth outside of the BSS bandwidth are ordered from the lowest to the highest frequency, within the EHT BSS bandwidth.

23. The method of claim 18, wherein the set of second fields are included in a transmit power envelope (TPE} element which includes a maximum allowed transmit power interpretation subfield that is set to a value indicating a local effective isotropically radiated power (EIRP) PSD or a regulatory client EIRP PSD.

24. An access point configured to advertise a maximum allowed transmit power spectral density (PSD) of a basic service set (BSS) to a station, comprising: a transmitter configured to transmit a first field to the station, wherein the first field indicates that the BSS bandwidth is set to M times a unit channel bandwidth, and transmit a set of second fields to the station, wherein the set of second fields includes K fields corresponding to K channels and wherein each of the K second fields indicates the maximum allowed transmit PSD for the K channels and the bandwidth of the channel is the unit channel bandwidth; and a receiver configured to receive from the station a frame wherein the maximum allowed transmit PSD of the M channels of the BSS bandwidth is based upon first M consecutive second fields, wherein the BSS bandwidth is a BSS bandwidth for non-EHT stations, an EHT BSS bandwidth is K times the unit channel bandwidth, the station uses M+1 to K second subfields to identify the maximum allowed transmit PSD of the EHT BSS bandwidth outside of the BSS bandwidth, and wherein the station is an EHT station.

25. The access point of claim 24, wherein the first M consecutive second fields indicates the maximum allowed transmit PSD for unit channels from the lowest to the highest frequency, respectively, within the BSS bandwidth for non-EHT STAs.

26. The access point of claim 25, wherein the channel bandwidth is 20 MHz.

27. The access point of claim 24, wherein the set of second fields are included in a transmit power envelope (TPE) element.

28. The access point claim 25, wherein the set of second fields are included in a transmit power envelope (TPE) element, and wherein the first M consecutive second fields are maximum allowed transmit PSD X subfields in the TPE, where X is a positive integer where 1 X<M.

29. The access point of claim 24, wherein M+1 to K second subfields to identify the maximum allowed transmit PSD of the EHT BSS bandwidth outside of the BSS bandwidth are ordered from the lowest to the highest frequency, within the EHT BSS bandwidth.

30. The access point of claim 25, wherein the TPE element includes a maximum allowed transmit power interpretation subfield that is set to a value indicating a local effective isotropically radiated power (EIRP) PSD or a regulatory client EIRP PSD.

* * * * *